United States Patent
Keledjian et al.

(10) Patent No.: US 9,006,360 B2
(45) Date of Patent: *Apr. 14, 2015

(54) CONTROLLED-RELEASE AMINE-CATALYZED, SULFUR-CONTAINING POLYMER AND EPDXY COMPOSITIONS

(71) Applicant: PRC-DeSoto International, Inc., Sylmar, CA (US)

(72) Inventors: Raquel Keledjian, Glendale, CA (US); Lawrence G. Anderson, Allison Park, PA (US); Renhe Lin, Stevenson Ranch, CA (US)

(73) Assignee: PRC-DeSoto International, Inc., Sylmar, CA (US)

( * ) Notice: Subject to any disclaimer, the term of this patent is extended or adjusted under 35 U.S.C. 154(b) by 197 days.

This patent is subject to a terminal disclaimer.

(21) Appl. No.: 13/659,113

(22) Filed: Oct. 24, 2012

(65) Prior Publication Data

US 2014/0110881 A1    Apr. 24, 2014

(51) Int. Cl.
| C08G 75/02 | (2006.01) |
| B32B 15/08 | (2006.01) |
| C08F 8/34 | (2006.01) |
| C09J 181/02 | (2006.01) |
| C08L 83/00 | (2006.01) |

(52) U.S. Cl.
CPC ............... *C08G 75/02* (2013.01); *B32B 15/08* (2013.01); *C08F 8/34* (2013.01); *C09J 181/02* (2013.01); *C08L 83/00* (2013.01)

(58) Field of Classification Search
CPC .............................. C08G 75/02; C09J 181/02
USPC ........................................................ 525/535
See application file for complete search history.

(56) References Cited

U.S. PATENT DOCUMENTS

| | | | |
|---|---|---|---|
| 3,940,374 A * | 2/1976 | Oswald et al. ................ 544/219 |
| 4,902,736 A * | 2/1990 | Nonaka et al. ............... 524/296 |
| 5,912,319 A * | 6/1999 | Zook et al. .................... 528/373 |
| 7,888,436 B2 * | 2/2011 | Szymanski et al. ........... 525/524 |
| 2004/0091716 A1* | 5/2004 | Van Den Berg et al. ... 428/422.8 |
| 2006/0175005 A1* | 8/2006 | Sawant et al. .............. 156/307.1 |
| 2007/0173602 A1* | 7/2007 | Brinkman et al. ............ 524/592 |
| 2011/0009557 A1* | 1/2011 | Lin ................ 524/588 |
| 2013/0345389 A1* | 12/2013 | Cai et al. ....................... 528/376 |

FOREIGN PATENT DOCUMENTS

| WO | WO 2012/061498 A2 | 5/2012 |
| WO | WO 2013/192266 A2 | 12/2013 |
| WO | WO 2013/192279 A2 | 12/2013 |

* cited by examiner

*Primary Examiner* — Mike M Dollinger
(74) *Attorney, Agent, or Firm* — William R. Lambert

(57) ABSTRACT

Compositions comprising sulfur-containing polymers such as polythioethers and polysulfides, polyepoxides, and controlled-release amine catalysts useful in aerospace sealant applications are disclosed. The compositions exhibit extended pot life and the rate of curing can be tailored for specific applications.

15 Claims, 1 Drawing Sheet

CONTROLLED-RELEASE AMINE-CATALYZED, SULFUR-CONTAINING POLYMER AND EPDXY COMPOSITIONS

FIELD

The present disclosure relates to compositions comprising sulfur-containing polymers such as polythioethers and polysulfides, polyepoxides, and controlled-release amine catalysts. The compositions are useful in aerospace sealant applications where they exhibit extended pot life and provide controlled curing rates.

BACKGROUND

Sealants useful in aerospace and other applications must satisfy demanding mechanical, chemical, and environmental requirements. The sealants can be applied to a variety of surfaces including metal surfaces, primer coatings, intermediate coatings, finished coatings, and aged coatings. Sealant compositions comprising sulfur-containing polymers that exhibit acceptable fuel resistance, thermal resistance, and flexibility for aerospace sealant applications are described in U.S. Pat. No. 6,172,179. In sealants such as those described in U.S. Publication Nos. 2006/0270796, 2007/0287810, and 2009/0326167, a sulfur-containing polymer such as a thiol-terminated polythioether is reacted with an epoxy curing agent in the presence of an amine catalyst to provide a cured product. These systems are useful as sealants and can meet the demanding performance requirements of the aerospace industry. Without a strong base catalyst, such as an amine catalyst, the reaction between the thiol and epoxy groups is slow and provides a relatively long pot life, for example, of several days to weeks, depending on the temperature. However, the physical properties of the cured sealants are generally not acceptable. In contrast, in the presence of a strong base catalyst the reaction is fast, and although exhibiting acceptable cured properties, provides a pot life of only about 2 hours to about 12 hours depending upon the particular system. For many applications, however, a longer pot life such as from 12 hours to 48 hours is desirable.

In practice, the compositions can be provided as two-part compositions in which the thiol-terminated sulfur-containing compound and the epoxy are provided as separate components, with the amine catalyst in the thiol component, and the two parts are mixed shortly prior to use. Alternatively, the base catalyst may be provided as a third component, and the component containing the thiol-terminated sulfur-containing polymer, the component containing the epoxy, and the component containing the base catalyst are mixed shortly before use. However, once the components are mixed, the thiol and epoxy groups react, and depending at least in part on the temperature and on the type of amine catalyst, the pot life is limited to less than 2 to 12 hours. Furthermore, as the composition cures, there is little ability to control the reaction rate to take advantage of the complex chemistries taking place after the sealant is applied to a surface.

Ways to prolong the pot life and to control the curing rate of compositions comprising thiol-terminated sulfur-containing polymers and polyepoxides are desired.

SUMMARY

Therefore, it is desirable to provide compositions that exhibit long pot life at ambient temperature and, following application to a surface, cure to form a cured sealant having acceptable properties for aerospace sealant applications. In certain embodiments, compositions provided by the present disclosure exhibit a pot life greater than 12 to 48 hours and cure within 24 to 72 hours after the useful working time.

The compositions provided by the present disclosure include a controlled-release amine catalyst, such as a strong amine catalyst incorporated into a matrix encapsulant. The amine catalyst may be released by diffusion at ambient temperature or may be released upon exposure to high temperature. In either case, the release of the amine catalyst is controlled in a manner that extends the pot life of a composition comprising a thiol-terminated sulfur-containing polymer and a polyepoxide. Furthermore, the thiol-terminated sulfur-containing polymer may be blocked with a group, such as an alkylsilane group, that reacts with water in the presence of moisture to release the reactive thiol-terminated sulfur-containing polymer thereby providing an additional way to extend the pot life.

In a first aspect, compositions are provided comprising (a) a sulfur-containing polymer selected from a thiol-terminated sulfur-containing polymer, a blocked thiol-terminated sulfur-containing polymer, and a combination thereof; (b) a polyepoxide curing agent; and (c) a controlled-release amine catalyst.

In a second aspect, compositions are provided comprising (a) a thiol-terminated sulfur-containing polymer; (b) a polyepoxide curing agent; and (c) a matrix encapsulant comprising an amine catalyst capable of being released by heat.

In a third aspect, compositions are provided comprising (a) blocked thiol-terminated, such as a silyl-blocked, sulfur-containing polymer; (b) a polyepoxide curing agent; and (c) a matrix encapsulant comprising an amine catalyst capable of being released at ambient temperature.

In a fourth aspect, methods of sealing an aperture are provided comprising (a) applying a composition provided by the present disclosure to at least one surface defining an aperture; (b) assembling the surfaces defining the aperture; and (c) curing the sealant to provide a sealed aperture.

Figure 1:
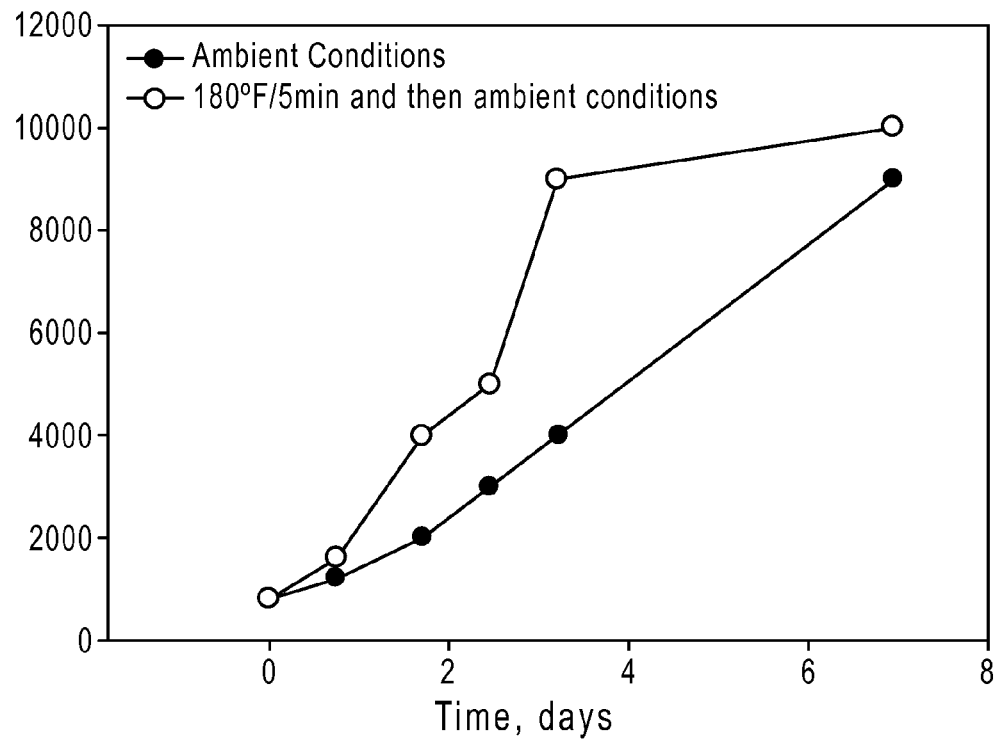
FIG. 1 is a graph showing the curing profile of a sealant composition comprising a matrix encapsulated amine of Example 2.

Reference is now made to certain embodiments of compositions and methods. The disclosed embodiments are not intended to be limiting of the claims. To the contrary, the claims are intended to cover all alternatives, modifications, and equivalents.

DETAILED DESCRIPTION

Definitions

For purposes of the following description, it is to be understood that embodiments provided by the present disclosure may assume various alternative variations and step sequences, except where expressly specified to the contrary. Moreover, other than in the examples, or where otherwise indicated, all numbers expressing, for example, quantities of ingredients used in the specification and claims are to be understood as being modified in all instances by the term "about." Accordingly, unless indicated to the contrary, the numerical parameters set forth in the following specification and attached claims are approximations that may vary depending upon the desired properties to be obtained. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard variation found in their respective testing measurements.

Also, it should be understood that any numerical range recited herein is intended to include all sub-ranges encompassed therein. For example, a range of "1 to 10" is intended to include all sub-ranges between (and including) the recited minimum value of about 1 and the recited maximum value of about 10, that is, having a minimum value equal to or greater than about 1 and a maximum value of equal to or less than about 10. Also, in this application, the use of "or" means "and/or" unless specifically stated otherwise, even though "and/or" may be explicitly used in certain instances.

A dash ("-") that is not between two letters or symbols is used to indicate a point of bonding for a substituent or between two atoms. For example, —CONH$_2$ is bonded to another chemical moiety through the carbon atom.

"Alkanediyl" refers to a diradical of a saturated, branched or straight-chain, acyclic hydrocarbon group, having, for example, from 1 to 18 carbon atoms ($C_{1-18}$), from 1 to 14 carbon atoms ($C_{1-14}$), from 1 to 6 carbon atoms ($C_{1-6}$), from 1 to 4 carbon atoms ($C_{1-4}$), or from 1 to 3 hydrocarbon atoms ($C_{1-3}$). It will be appreciated that a branched alkanediyl has a minimum of three carbon atoms. In certain embodiments, the alkanediyl is $C_{2-14}$ alkanediyl, $C_{2-10}$ alkanediyl, $C_{2-8}$ alkanediyl, $C_{2-6}$ alkanediyl, $C_{2-4}$ alkanediyl, and in certain embodiments, $C_{2-3}$ alkanediyl. Examples of alkanediyl groups include methane-diyl (—CH$_2$—), ethane-1,2-diyl (—CH$_2$CH$_2$—), propane-1,3-diyl and iso-propane-1,2-diyl (e.g., —CH$_2$CH$_2$CH$_2$— and —CH(CH$_3$)CH$_2$—), butane-1,4-diyl (—CH$_2$CH$_2$CH$_2$CH$_2$—), pentane-1,5-diyl (—CH$_2$CH$_2$CH$_2$CH$_2$CH$_2$—), hexane-1,6-diyl (—CH$_2$CH$_2$CH$_2$CH$_2$CH$_2$CH$_2$—), heptane-1,7-diyl, octane-1,8-diyl, nonane-1,9-diyl, decane-1,10-diyl, dodecane-1,12-diyl, and the like.

"Alkanecycloalkane" refers to a saturated hydrocarbon group having one or more cycloalkyl and/or cycloalkanediyl groups and one or more alkyl and/or alkanediyl groups, where cycloalkyl, cycloalkanediyl, alkyl, and alkanediyl are defined herein. In certain embodiments, each cycloalkyl and/or cycloalkanediyl group(s) is $C_{3-6}$, $C_{5-6}$, and in certain embodiments, cyclohexyl or cyclohexanediyl. In certain embodiments, each alkyl and/or alkanediyl group(s) is $C_{1-6}$, $C_{1-4}$, $C_{1-3}$, and in certain embodiments, methyl, methanediyl, ethyl, or ethane-1,2-diyl. In certain embodiments, the alkanecycloalkane group is $C_{4-18}$ alkanecycloalkane, $C_{4-16}$ alkanecycloalkane, $C_{4-12}$ alkanecycloalkane, $C_{4-8}$ alkanecycloalkane, $C_{6-12}$ alkanecycloalkane, $C_{6-10}$ alkanecycloalkane, and in certain embodiments, $C_{6-9}$ alkanecycloalkane. Examples of alkanecycloalkane groups include 1,1,3,3-tetramethylcyclohexane and cyclohexylmethane.

"Alkanecycloalkanediyl" refers to a diradical of an alkanecycloalkane group. In certain embodiments, the alkanecycloalkanediyl group is $C_{4-18}$ alkanecycloalkanediyl, $C_{4-16}$ alkanecycloalkanediyl, $C_{4-12}$ alkanecycloalkanediyl, $C_{4-8}$ alkanecycloalkanediyl, $C_{6-12}$ alkanecycloalkanediyl, $C_{6-10}$ alkanecycloalkanediyl, and in certain embodiments, $C_{6-9}$ alkanecycloalkanediyl. Examples of alkanecycloalkanediyl groups include 1,1,3,3-tetramethylcyclohexane-1,5-diyl and cyclohexylmethane-4,4'-diyl.

"Alkanearene" refers to a hydrocarbon group having one or more aryl and/or arenediyl groups and one or more alkyl and/or alkanediyl groups, where aryl, arenediyl, alkyl, and alkanediyl are defined here. In certain embodiments, each aryl and/or arenediyl group(s) is $C_{6-12}$, $C_{6-10}$, and in certain embodiments, phenyl or benzenediyl. In certain embodiments, each alkyl and/or alkanediyl group(s) is $C_{1-6}$, $C_{1-4}$, $C_{1-3}$, and in certain embodiments, methyl, methanediyl, ethyl, or ethane-1,2-diyl. In certain embodiments, the alkanearene group is $C_{4-18}$ alkanearene, $C_{4-16}$ alkanearene, $C_{4-12}$ alkanearene, $C_{4-8}$ alkanearene, $C_{6-12}$ alkanearene, $C_{6-10}$ alkanearene, and in certain embodiments, $C_{6-9}$ alkanearene. Examples of alkanearene groups include diphenyl methane.

"Alkanearenediyl" refers to a diradical of an alkanearene group. In certain embodiments, the alkanearenediyl group is $C_{4-18}$ alkanearenediyl, $C_{4-16}$ alkanearenediyl, $C_{4-12}$ alkanearenediyl, $C_{4-8}$ alkanearenediyl, $C_{6-12}$ alkanearenediyl, $C_{6-10}$ alkanearenediyl, and in certain embodiments, $C_{6-9}$ alkanearenediyl. Examples of alkanearenediyl groups include diphenyl methane-4,4'-diyl.

"Alkenyl" group refers to a group (R)$_2$C=C(R)$_2$. In certain embodiments, an alkenyl group has the structure —RC=C(R)$_2$ where the alkenyl group is a terminal group and is bonded to a larger molecule. In such embodiments, each R may be selected from, for example, hydrogen and $C_{1-3}$ alkyl. In certain embodiments, each R is hydrogen and an alkenyl group has the structure —CH=CH$_2$.

"Alkoxy" refers to a —OR group where R is alkyl as defined herein. Examples of alkoxy groups include methoxy, ethoxy, n-propoxy, isopropoxy, and n-butoxy. In certain embodiments, the alkoxy group is $C_{1-8}$ alkoxy, $C_{1-6}$ alkoxy, $C_{1-4}$ alkoxy, and in certain embodiments, $C_{1-3}$ alkoxy.

"Alkyl" refers to a monoradical of a saturated, branched or straight-chain, acyclic hydrocarbon group having, for example, from 1 to 20 carbon atoms, from 1 to 10 carbon atoms, from 1 to 6 carbon atoms, from 1 to 4 carbon atoms, or from 1 to 3 carbon atoms. It will be appreciated that a branched alkyl has a minimum of three carbon atoms. In certain embodiments, the alkyl group is $C_{2-6}$ alkyl, $C_{2-4}$ alkyl, and in certain embodiments, $C_{2-3}$ alkyl. Examples of alkyl groups include methyl, ethyl, n-propyl, iso-propyl, n-butyl, iso-butyl, tert-butyl, n-hexyl, n-decyl, tetradecyl, and the like. In certain embodiments, the alkyl group is $C_{2-6}$ alkyl, $C_{2-4}$ alkyl, and in certain embodiments, $C_{2-3}$ alkyl. It will be appreciated that a branched alkyl has at least three carbon atoms.

"Arenediyl" refers to diradical monocyclic or polycyclic aromatic group. Examples of arenediyl groups include benzene-diyl and naphthalene-diyl. In certain embodiments, the arenediyl group is $C_{6-12}$ arenediyl, $C_{6-10}$ arenediyl, $C_{6-9}$ arenediyl, and in certain embodiments, benzene-diyl.

"Cycloalkanediyl" refers to a diradical saturated monocyclic or polycyclic hydrocarbon group. In certain embodiments, the cycloalkanediyl group is $C_{3-12}$ cycloalkanediyl, $C_{3-8}$ cycloalkanediyl, $C_{3-6}$ cycloalkanediyl, and in certain embodiments, $C_{5-6}$ cycloalkanediyl. Examples of cycloalkanediyl groups include cyclohexane-1,4-diyl, cyclohexane-1,3-diyl, and cyclohexane-1,2-diyl.

"Cycloalkyl" refers to a saturated monocyclic or polycyclic hydrocarbon monoradical group. In certain embodiments, the cycloalkyl group is $C_{3-12}$ cycloalkyl, $C_{3-8}$ cycloalkyl, $C_{3-6}$ cycloalkyl, and in certain embodiments, $C_{5-6}$ cycloalkyl.

"Heteroalkanediyl" refers to an alkanediyl group in which one or more of the carbon atoms are replaced with a heteroatom, such as N, O, S, or P. In certain embodiments of heteroalkanediyl, the heteroatom is selected from N and O.

"Heterocycloalkanediyl" refers to a cycloalkanediyl group in which one or more of the carbon atoms are replaced with a heteroatom, such as N, O, S, or P. In certain embodiments of heterocycloalkanediyl, the heteroatom is selected from N and O.

"Heteroarenediyl" refers to an arenediyl group in which one or more of the carbon atoms are replaced with a heteroatom, such as N, O, S, or P. In certain embodiments of heteroarenediyl, the heteroatom is selected from N and O.

"Heterocycloalkanediyl" refers to a cycloalkanediyl group in which one or more of the carbon atoms are replaced with a heteroatom, such as N, O, S, or P. In certain embodiments of heterocycloalkanediyl, the heteroatom is selected from N and O.

As used herein, "polymer" refers to oligomers, homopolymers, and copolymers. Unless stated otherwise, molecular weights are number average molecular weights for polymeric materials indicated as "Mn" as determined, for example, by gel permeation chromatography using a polystyrene standard in an art-recognized manner.

"Substituted" refers to a group in which one or more hydrogen atoms are each independently replaced with the same or different substituent(s). In certain embodiments, the substituent is selected from halogen, —S(O)$_2$OH, —S(O)$_2$, —SH, —SR where R is $C_{1-6}$ alkyl, —COOH, —NO$_2$, —NR$_2$ where each R is independently selected from hydrogen and $C_{1-3}$ alkyl, —CN, =O, $C_{1-6}$ alkyl, —CF$_3$, —OH, phenyl, $C_{2-6}$ heteroalkyl, $C_{5-6}$ heteroaryl, $C_{1-6}$ alkoxy, and —COR where R is $C_{1-6}$ alkyl. In certain embodiments, the substituent is chosen from —OH, —NH$_2$, and $C_{1-3}$ alkyl.

Compositions

Compositions comprising a sulfur-containing polymer, a polyepoxide, and a controlled release amine catalyst are disclosed. A sulfur-containing polymer used in the compositions includes thiol-terminated polythioethers, blocked thiol-terminated polythioethers, such as thiol-terminated polythioethers blocked or terminated with a silyl group, and combinations thereof. A thiol-terminated polythioether blocked with a silyl group is also referred to herein as a silyl-blocked polythioether. When exposed to moisture, the terminal silyl group reacts with water to release a thiol-terminated polythioether. A controlled release amine catalyst used in compositions provided by the present disclosure can, for example, comprise a matrix encapsulant that incorporates an amine catalyst. In these embodiments, the amine catalyst can diffuse from the matrix encapsulant at ambient temperature, or may diffuse from the matrix in the presence of heat. Upon release of the catalytic amine, the catalytic amine can catalyze the reaction between a thiol-terminated sulfur-containing polymer such as a thiol-terminated polythioether terminated and a polyepoxide. In certain embodiments, compositions provided by the present disclosure comprise a thiol-terminated polythioether, a polyepoxide, and a controlled-release amine catalyst in which the catalytic amine is released in the presence of heat. In certain embodiments, compositions provided by the present disclosure comprise a silyl-blocked polythioether, a polyepoxide, and a controlled-release amine catalyst, in which the catalytic amine is released by diffusion at ambient temperature and the silyl-blocked polythioether reacts with ambient moisture to release the corresponding thiol-terminated polythioether.

Thiol-Terminated Sulfur-Containing Polymers

In certain embodiments, compositions provided by the present disclosure comprise a thiol-terminated sulfur-containing polymer.

In certain embodiments, a sulfur-containing polymer is selected from a polythioether, a polysulfide, and a combination thereof. In certain embodiments the sulfur-containing polymer comprises a polythioether, and in certain embodiments, the sulfur-containing polymer comprises a polysulfide. The sulfur-containing polymer may comprise a mixture of different polythioethers and/or polysulfides, and the polythioethers and/or polysulfides may have the same or different functionality. In certain embodiments, the sulfur-containing polymer has an average functionality from 2 to 6, from 2 to 4, from 2 to 3, and in certain embodiments, from 2.05 to 2.8. For example, a sulfur-containing polymer can be selected from a difunctional sulfur-containing polymer, a trifunctional sulfur-containing polymer, and a combination thereof.

In certain embodiments, a sulfur-containing polymer is thiol-terminated, and in certain embodiments, comprises a thiol-terminated polythioether. Examples of thiol-terminated polythioethers are disclosed, for example, in U.S. Pat. No. 6,172,179. In certain embodiments, a thiol-terminated polythioether comprises Permapol® P3.1E, available from PRC-DeSoto International Inc., Sylmar, Calif.

In certain embodiments, a sulfur-containing polymer comprises a polythioether comprising:

(a) a backbone comprising the structure of Formula (1):

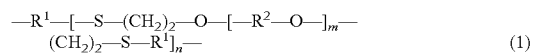

wherein:

(i) each $R^1$ is independently selected from a $C_{2-10}$ n-alkanediyl group, a $C_{3-6}$ branched alkanediyl group, a $C_{6-8}$ cycloalkanediyl group, a $C_{6-10}$ alkanecycloalkanediyl group, a heterocyclic group, a —[(—CHR$^3$—)$_p$—X—]$_q$—(CHR$^3$)$_r$— group, wherein each $R^3$ is selected from hydrogen and methyl;

(ii) each $R^2$ is independently selected from a $C_{2-10}$ n-alkanediyl group, a $C_{3-6}$ branched alkanediyl group, a $C_{6-8}$ cycloalkanediyl group, a $C_{6-14}$ alkanecycloalkanediyl group, a heterocyclic group, and a —[(—CH$_2$—)$_p$—X—]$_q$—(CH$_2$)$_r$— group;

(iii) each X is independently selected from —O—, —S—, and a —NR$^6$— group, in which $R^6$ is selected from H and a methyl group;

(iv) m ranges from 0 to 50;

(v) n is an integer ranging from 1 to 60;

(vi) p is an integer ranging from 2 to 6;

(vii) q is an integer ranging from 1 to 5; and (viii) r is an integer ranging from 2 to 10.

In certain embodiments, a thiol-terminated sulfur-containing polymer comprises a thiol-terminated polythioether selected from a thiol-terminated polythioether of Formula (2), a thiol-terminated polythioether of Formula (2a), and a combination thereof:

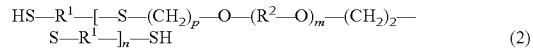

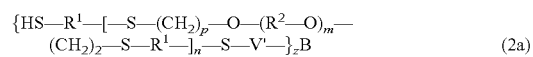

wherein:
each $R^1$ independently is selected from $C_{2-10}$ alkanediyl, $C_{6-8}$ cycloalkanediyl, $C_{6-14}$ alkanecycloalkanediyl, $C_{5-8}$ heterocycloalkanediyl, and —[(—CHR$^3$—)$_s$—X—]$_q$—(—CHR$^3$—)$_r$—, wherein:
s is an integer from 2 to 6;
q is an integer from 1 to 5;
r is an integer from 2 to 10;
each $R^3$ is independently selected from hydrogen and methyl; and
each X is independently selected from —O—, —S—, and —NHR—, wherein R is selected from hydrogen and methyl;
each $R^2$ is independently selected from $C_{1-10}$ alkanediyl, $C_{6-8}$ cycloalkanediyl, $C_{6-14}$ alkanecycloalkanediyl, and —[(—CHR$^3$—)$_s$—X—]$_q$—(—CHR$^3$—)$_r$—, wherein s, q, r, $R^3$, and X are as defined as for $R^1$;
m is an integer from 0 to 50;
n is an integer from 1 to 60;
p is an integer from 2 to 6;
B represents a core of a z-valent, vinyl-terminated polyfunctionalizing agent B(—V)$_z$, wherein:
z is an integer from 3 to 6; and
each V is a group comprising a terminal vinyl group; and each —V'— is derived from the reaction of —V with a thiol.

In certain embodiments of Formula (2) and Formula (2a), $R^1$ is —[(—CH$_2$—)$_p$—X—]$_q$—(CH$_2$)$_r$—, where p is 2, X is —O—, q is 2, r is 2, $R^2$ is ethanediyl, m is 2, and n is 9.

In certain embodiments of Formula (2) and Formula (4a), $R^1$ is selected from $C_{2-6}$ alkanediyl and —[—(CHR$^3$)$_s$—X—]$_q$—(CHR$^3$)$_r$—.

In certain embodiments of Formula (2) and Formula (2a), $R^1$ is —[—(CHR$^3$)s-X—]$_q$—CHR$^3$)$_r$—, and in certain embodiments X is —O— and in certain embodiments, X is —S—.

In certain embodiments of Formula (2) and Formula (2a), where $R^1$ is —[—(CHR$^3$)$_s$—X—]$_q$—(CHR$^3$)$_r$—, p is 2, r is 2, q is 1, and X is —S—; in certain embodiments, wherein p is 2, q is 2, r is 2, and X is —O—; and in certain embodiments, p is 2, r is 2, q is 1, and X is —O—.

In certain embodiments of Formula (2) and Formula (2a), where $R^1$ is —[—(CHR$^3$)$_s$—X—]$_q$—(CHR$^3$)$_r$—, each $R^3$ is hydrogen, and in certain embodiments, at least one $R^3$ is methyl.

In certain embodiments of Formula (2) and Formula (2a), each $R^1$ is the same, and in certain embodiments, at least one $R^1$ is different.

Various methods can be used to prepare such polythioethers. Examples of suitable thiol-terminated polythioethers, and methods for their production, are described, for example, in U.S. Pat. No. 6,172,179 at col. 2, line 29 to col. 4, line 22; col. 6, line 39 to col. 10, line 50; and col. 11, lines 65 to col. 12, line 22, the cited portions of which are incorporated by reference. Such thiol-terminated polythioethers may be difunctional, that is, linear polymers having two thiol terminal groups, or polyfunctional, that is, branched polymers have three or more thiol terminal groups. Thiol-terminated polythioethers may also comprise a combination of difunctional and polyfunctional thiol-terminated polythioethers. Suitable thiol-terminated polythioethers are commercially available, for example, as Permapol® P3.1E, from PRC-DeSoto International Inc., Sylmar, Calif.

Suitable thiol-terminated polythioethers may be produced by reacting a divinyl ether or mixtures of divinyl ethers with an excess of dithiol or mixtures of dithiols. For example, dithiols suitable for use in preparing thiol-terminated polythioethers include those of Formula (3), other dithiols disclosed herein, or combinations of any of the dithiols disclosed herein.

In certain embodiments, a dithiol has the structure of Formula (3):

$$HS—R^1—SH \qquad (3)$$

wherein:
$R^1$ is selected from $C_{2-6}$ alkanediyl, $C_{6-8}$ cycloalkanediyl, $C_{6-10}$ alkanecycloalkanediyl, $C_{5-8}$ heterocycloalkanediyl, and —[—(CHR$^3$)$_s$—X—]$_q$—(CHR$^3$)$_r$—;
wherein:
each $R^3$ is independently selected from hydrogen and methyl;
each X is independently selected from —O—, —S—, and —NR— wherein R is selected from hydrogen and methyl;
s is an integer from 2 to 6;
q is an integer from 1 to 5; and
r is an integer from 2 to 10.

In certain embodiments of a dithiol of Formula (3), $R^1$ is —[—(CHR$^3$)$_s$—X—]$_q$—(CHR$^3$)$_r$—.

In certain embodiments of a compound of Formula (3), X is selected from —O— and —S—, and thus —[—(CHR$^3$)$_s$—X—]$_q$—(CHR$^3$)$_r$— in Formula (5) is —[(—CHR$^3$—)$_p$—O—]$_q$—(CHR$^3$)$_r$— or —[(—CHR$^3_2$—)$_p$—S—]$_q$—(CHR$^3$)$_r$—. In certain embodiments, p and r are equal, such as where p and r are both two.

In certain embodiments of a dithiol of Formula (3), $R^1$ is selected from $C_{2-6}$ alkanediyl and —[—(CHR$^3$)$_s$—X—]$_q$—(CHR$^3$)$_r$—.

In certain embodiments, $R^1$ is —[—(CHR$^3$)$_s$—X—]$_q$—(CHR$^3$)$_r$—, and in certain embodiments X is —O—, and in certain embodiments, X is —S—.

In certain embodiments where $R^1$ is —[—(CHR$^3$)$_s$—X—]$_q$—(CHR$^3$)$_r$—, p is 2, r is 2, q is 1, and X is —S—; in certain embodiments, wherein p is 2, q is 2, r is 2, and X is —O—; and in certain embodiments, p is 2, r is 2, q is 1, and X is —O—.

In certain embodiments where $R^1$ is —[—(CHR$^3$)$_s$—X—]$_q$—(CHR$^3$)$_r$—, each $R^3$ is hydrogen, and in certain embodiments, at least one $R^3$ is methyl.

Examples of suitable dithiols include, for example, 1,2-ethanedithiol, 1,2-propanedithiol, 1,3-propanedithiol, 1,3-butanedithiol, 1,4-butanedithiol, 2,3-butanedithiol, 1,3-pentanedithiol, 1,5-pentanedithiol, 1,6-hexanedithiol, 1,3-dimercapto-3-methylbutane, dipentenedimercaptan, ethylcyclohexyldithiol (ECHDT), dimercaptodiethylsulfide, methyl-substituted dimercaptodiethylsulfide, dimethyl-substituted dimercaptodiethylsulfide, dimercaptodioxaoctane, 1,5-dimercapto-3-oxapentane, and a combination of any of the foregoing. A polythiol may have one or more pendant groups selected from a lower (e.g., $C_{1-6}$) alkyl group, a lower alkoxy group, and a hydroxyl group. Suitable alkyl pendant groups include, for example, $C_{1-6}$ linear alkyl, $C_{3-6}$ branched alkyl, cyclopentyl, and cyclohexyl.

Other examples of suitable dithiols include dimercaptodiethylsulfide (DMDS) (in Formula (3), $R^1$ is —[(—CH$_2$—)$_p$—X—]$_q$—(CH$_2$)$_r$—, wherein p is 2, r is 2, q is 1, and X is —S—); dimercaptodioxaoctane (DMDO) (in Formula (3), $R^1$ is —[(—CH$_2$—)$_p$—X—]$_q$—(CH$_2$)$_r$—, wherein p is 2, q is 2, r is 2, and X is —O—); and 1,5-dimercapto-3-oxapentane (in Formula (3), $R^1$ is —[(—CH$_2$—)$_p$—X—]$_q$—(CH$_2$)$_r$—, wherein p is 2, r is 2, q is 1, and X is —O—). It is also possible to use dithiols that include both heteroatoms in the carbon backbone and pendant alkyl groups, such as methyl groups. Such compounds include, for example, methyl-substituted DMDS, such as HS—CH$_2$CH(CH$_3$)—S—CH$_2$CH$_2$—SH, HS—CH(CH$_3$)CH$_2$—S—CH$_2$CH$_2$—SH and dimethyl substituted DMDS, such as HS—CH$_2$CH(CH$_3$)—S—CHCH$_3$CH$_2$—SH and HS—CH(CH$_3$)CH$_2$—S—CH$_2$CH(CH$_3$)—SH.

Suitable divinyl ethers for preparing polythioethers and polythioether adducts include, for example, divinyl ethers of Formula (4):

$$CH_2=CH-O-(-R^2-O-)_m-CH=CH_2 \qquad (4)$$

where R$^2$ in Formula (4) is selected from a C$_{2-6}$ n-alkanediyl group, a C$_{3-6}$ branched alkanediyl group, a C$_{6-8}$ cycloalkanediyl group, a C$_{6-10}$ alkanecycloalkanediyl group, and —[(—CH$_2$—)$_p$—O—]$_q$—(—CH$_2$—)$_r$—, where p is an integer ranging from 2 to 6, q is an integer from 1 to 5, and r is an integer from 2 to 10. In certain embodiments of a divinyl ether of Formula (4), R$^2$ is a C$_{2-6}$ n-alkanediyl group, a C$_{3-6}$ branched alkanediyl group, a C$_{6-8}$ cycloalkanediyl group, a C$_{6-10}$ alkanecycloalkanediyl group, and in certain embodiments, —[(—CH$_2$—)$_p$—O—]$_q$—(—CH$_2$—)$_r$—.

Suitable divinyl ethers include, for example, compounds having at least one oxyalkanediyl group, such as from 1 to 4 oxyalkanediyl groups, i.e., compounds in which m in Formula (4) is an integer ranging from 1 to 4. In certain embodiments, m in Formula (4) is an integer ranging from 2 to 4. It is also possible to employ commercially available divinyl ether mixtures that are characterized by a non-integral average value for the number of oxyalkanediyl units per molecule. Thus, m in Formula (4) can also take on rational number values ranging from 0 to 10.0, such as from 1.0 to 10.0, from 1.0 to 4.0, or from 2.0 to 4.0.

Examples of suitable divinyl ethers include, for example, divinyl ether, ethylene glycol divinyl ether (EG-DVE) (R$^2$ in Formula (4) is ethanediyl and m is 1), butanediol divinyl ether (BD-DVE) (R$^2$ in Formula (4) is butanediyl and m is 1), hexanediol divinyl ether (HD-DVE) (R$^2$ in Formula (4) is hexanediyl and m is 1), diethylene glycol divinyl ether (DEG-DVE) (R$^2$ in Formula (4) is ethanediyl and m is 2), triethylene glycol divinyl ether (R$^2$ in Formula (4) is ethanediyl and m is 3), tetraethylene glycol divinyl ether (R$^2$ in Formula (4) is ethanediyl and m is 4), cyclohexanedimethanol divinyl ether, polytetrahydrofuryl divinyl ether; trivinyl ether monomers, such as trimethylolpropane trivinyl ether; tetrafunctional ether monomers, such as pentaerythritol tetravinyl ether; and combinations of two or more such polyvinyl ether monomers. A polyvinyl ether may have one or more pendant groups selected from alkyl groups, hydroxyl groups, alkoxy groups, and amine groups.

In certain embodiments, divinyl ethers in which R$^2$ in Formula (4) is C$_{3-6}$ branched alkanediyl may be prepared by reacting a polyhydroxy compound with acetylene. Examples of divinyl ethers of this type include compounds in which R$^2$ in Formula (4) is an alkyl-substituted methanediyl group such as —CH(CH$_3$)— (for example Pluriol® blends such as Pluriol®E-200 divinyl ether (BASF Corp., Parsippany, N.J.), for which R$^2$ in Formula (4) is ethanediyl and m is 3.8) or an alkyl-substituted ethanediyl (for example —CH$_2$CH(CH$_3$)— such as DPE polymeric blends including DPE-2 and DPE-3, International Specialty Products, Wayne, N.J.).

Other useful divinyl ethers include compounds in which R$^2$ in Formula (4) is polytetrahydrofuryl (poly-THF) or polyoxyalkanediyl, such as those having an average of about 3 monomer units.

Two or more types of polyvinyl ether monomers of Formula (4) may be used. Thus, in certain embodiments, two dithiols of Formula (3) and one polyvinyl ether monomer of Formula (4), one dithiol of Formula (3) and two polyvinyl ether monomers of Formula (4), two dithiols of Formula (3) and two divinyl ether monomers of Formula (4), and more than two compounds of one or both Formula (3) and Formula (4), may be used to produce a variety of thiol-terminated polythioethers.

In certain embodiments, a polyvinyl ether monomer comprises 20 to less than 50 mole percent of the reactants used to prepare a thiol-terminated polythioether, and in certain embodiments, 30 to less than 50 mole percent.

In certain embodiments provided by the present disclosure, relative amounts of dithiols and divinyl ethers are selected to yield polythioethers having terminal thiol groups. Thus, a dithiol of Formula (3) or a mixture of at least two different dithiols of Formula (3), are reacted with of a divinyl ether of Formula (4) or a mixture of at least two different divinyl ethers of Formula (4) in relative amounts such that the molar ratio of thiol groups to vinyl groups is greater than 1:1, such as 1.1 to 2.0:1.0.

The reaction between compounds of dithiols and divinyl ethers may be catalyzed by a free radical catalyst. Suitable free radical catalysts include, for example, azo compounds, for example azobisnitriles such as azo(bis)isobutyronitrile (AIBN); organic peroxides such as benzoyl peroxide and t-butyl peroxide; and inorganic peroxides such as hydrogen peroxide. The catalyst may be a free-radical catalyst, an ionic catalyst, or ultraviolet radiation. In certain embodiments, the catalyst does not comprise acidic or basic compounds, and does not produce acidic or basic compounds upon decomposition. Examples of free-radical catalysts include azo-type catalyst, such as Vazo®-57 (Du Pont), Vazo®-64 (Du Pont), Vazo®-67 (Du Pont), V-70® (Wako Specialty Chemicals), and V-65B® (Wako Specialty Chemicals). Examples of other free-radical catalysts are alkyl peroxides, such as t-butyl peroxide. The reaction may also be effected by irradiation with ultraviolet light either with or without a cationic photoinitiating moiety.

Thiol-terminated polythioethers provided by the present disclosure may be prepared by combining at least one compound of Formula (3) and at least one compound of Formula (4) followed by addition of an appropriate catalyst, and carrying out the reaction at a temperature from 30° C. to 120° C., such as 70° C. to 90° C., for a time from 2 to 24 hours, such as 2 to 6 hours.

As disclosed herein, thiol-terminated polythioethers may comprise a polyfunctional polythioether, i.e., may have an average functionality of greater than 2.0. Suitable polyfunctional thiol-terminated polythioethers include, for example, those having the structure of Formula (5):

$$B(-A-SH)_z \qquad (5)$$

wherein: (i) A comprises, for example, a structure of Formula (1), (ii) B denotes a z-valent residue of a polyfunctionalizing agent; and (iii) z has an average value of greater than 2.0, and, in certain embodiments, a value between 2 and 3, a value between 2 and 4, a value between 3 and 6, and in certain embodiments, is an integer from 3 to 6.

Polyfunctionalizing agents suitable for use in preparing such polyfunctional thiol-functional polymers include trifunctionalizing agents, that is, compounds where z is 3. Suitable trifunctionalizing agents include, for example, triallyl cyanurate (TAC), 1,2,3-propanetrithiol, isocyanurate-containing trithiols, and combinations thereof, as disclosed in U.S. Publication No. 2010/0010133 at paragraphs [0102]-[0105], the cited portion of which is incorporated herein by reference. Other useful polyfunctionalizing agents include trimethylolpropane trivinyl ether, and the polythiols described in U.S. Pat. Nos. 4,366,307; 4,609,762; and 5,225,472. Mixtures of polyfunctionalizing agents may also be used.

As a result, thiol-terminated polythioethers suitable for use in embodiments provided by the present disclosure may have a wide range of average functionality. For example, trifunctionalizing agents may afford average functionalities from 2.05 to 3.0, such as from 2.1 to 2.6. Wider ranges of average functionality may be achieved by using tetrafunctional or higher functionality polyfunctionalizing agents. Functionality may also be affected by factors such as stoichiometry, as will be understood by those skilled in the art.

Thiol-terminated polythioethers having a functionality greater than 2.0 may be prepared in a manner similar to the difunctional thiol-terminated polythioethers described in U.S. Publication No. 2010/0010133. In certain embodiments, polythioethers may be prepared by combining (i) one or more dithiols described herein, with (ii) one or more divinyl ethers described herein, and (iii) one or more polyfunctionalizing agents. The mixture may then be reacted, optionally in the presence of a suitable catalyst, to afford a thiol-terminated polythioether having a functionality greater than 2.0.

Thus, in certain embodiments, a thiol-terminated polythioether comprises the reaction product of reactants comprising:
(a) a dithiol of Formula (3):

$$HS-R^1-SH \quad (3)$$

wherein:
R$^1$ is selected from C$_{2-6}$ alkanediyl, C$_{6-8}$ cycloalkanediyl, C$_{6-10}$ alkanecycloalkanediyl, C$_{5-8}$ heterocycloalkanediyl, and —[—(CHR$^3$)$_s$—X—]$_q$—(CHR$^3$)$_r$—; wherein:
each R$^3$ is independently selected from hydrogen and methyl; each X is independently selected from —O—, —S—, —NH—, and —NR— wherein R is selected from hydrogen and methyl;
s is an integer from 2 to 6;
q is an integer from 1 to 5; and
r is an integer from 2 to 10; and
(b) a divinyl ether of Formula (4):

$$CH_2=CH-O-[-R^2-O-]_m-CH=CH_2 \quad (4)$$

wherein:
each R$^2$ is independently selected from C$_{1-10}$ alkanediyl, C$_{6-8}$ cycloalkanediyl, C$_{6-14}$ alkanecycloalkanediyl, and —[(—CHR$^3$—)$_s$—X—]$_q$—(—CHR$^3$—)$_r$—, wherein s, q, r, R$^3$, and X are as defined above;
m is an integer from 0 to 50;
n is an integer from 1 to 60; and
p is an integer from 2 to 6.

And, in certain embodiments, the reactants comprise (c) a polyfunctional compound such as a polyfunctional compound B(—V)$_z$, where B, —V, and z are as defined herein.

Thiol-terminated polythioethers provided by the present disclosure represent thiol-terminated polythioethers having a molecular weight distribution. In certain embodiments, useful thiol-terminated polythioethers can exhibit a number average molecular weight ranging from 500 Daltons to 20,000 Daltons, in certain embodiments, from 2,000 Daltons to 5,000 Daltons, and in certain embodiments, from 3,000 Daltons to 4,000 Daltons. In certain embodiments, useful thiol-terminated polythioethers exhibit a polydispersity (M$_w$/M$_n$; weight average molecular weight/number average molecular weight) ranging from 1 to 20, and in certain embodiments, from 1 to 5. The molecular weight distribution of thiol-terminated polythioethers may be characterized by gel permeation chromatography.

In certain embodiments, thiol-terminated polythioethers provided by the present disclosure are essentially free, or free, of sulfone, ester and/or disulfide linkages. As used herein, "essentially free of sulfone, ester, and/or disulfide linkages" means that less than 2 mole percent of the linkages in the thiol-terminated polymer are sulfone, ester, and/or disulfide linkages. As a result, in certain embodiments, the resulting thiol-terminated polythioethers are also essentially free, or free, of sulfone, ester, and/or disulfide linkages.

Silyl-Blocked Sulfur-Containing Polymers

To further extend the pot life of a thiol/epoxy composition, the thiol groups may be protected or blocked with a moisture-reactive moiety such as a trialkylsilane group. Moisture-curable sealant compositions in which the sulfur-containing polymer component is terminated with a silyl-functional group are disclosed in U.S. application Ser. No. 13/348,718. The silyl group may be removed or deblocked in the presence of moisture to expose a reactive thiol group that can be used with a variety of curing chemistries to provide a cured sealant. The use of trialkylsilane groups to block reactive thiol groups can further extend the pot life of compositions employing thiol-epoxy reactions.

Thus, in certain embodiments, compositions provided by the present disclosure comprise (a) a silyl-blocked sulfur-containing polymer; (b) a curing agent; and (c) a controlled release amine catalyst. In certain embodiments, a silyl-blocked sulfur-containing polymer comprises a silyl-blocked polythioether, and in certain embodiments, a thiol-terminated polythioether that is blocked with a trialkylsilane group. In the presence of moisture the trialkylsilane groups of the silyl-blocked thiol-terminated polythioether will react to release the corresponding thiol-terminated polythioether.

In certain embodiments, a silyl-blocked sulfur-containing polymer is selected from a silyl-blocked polythioether of Formula (6), a silyl-blocked polythioether adduct of Formula (6a), and a combination thereof:

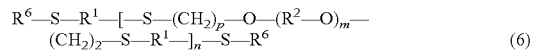

$$R^6-S-R^1-[-S-(CH_2)_p-O-(R^2-O)_m-(CH_2)_2-S-R^1-]_n-S-R^6 \quad (6)$$

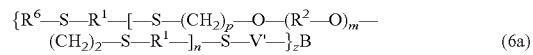

$$\{R^6-S-R^1-[-S-(CH_2)_p-O-(R^2-O)_m-(CH_2)_2-S-R^1-]_n-S-V'-\}_zB \quad (6a)$$

wherein:
each R$^1$ independently is selected from C$_{2-6}$ alkanediyl, C$_{6-8}$ cycloalkanediyl, C$_{6-10}$ alkanecycloalkanediyl, C$_{5-8}$ heterocycloalkanediyl, and —[(—CHR$^3$—)$_s$—X—]$_q$—(—CHR$^3$—)$_r$—; wherein:
s is an integer from 2 to 6;
q is an integer from 1 to 5;
r is an integer from 2 to 10;
each R$^3$ is independently selected from hydrogen and methyl; and
each X is independently selected from —O—, —S—, and —NHR—, wherein R is selected from hydrogen and methyl;
each R$^2$ is independently selected from C$_{1-10}$ alkanediyl, C$_{6-8}$ cycloalkanediyl, C$_{6-14}$ alkanecycloalkanediyl, and —[(—CHR$^3$—)$_s$—X—]$_q$—(—CHR$^3$—)$_r$—, wherein s, q, r, R$^3$, and X are as defined above;
m is an integer from 0 to 50;
n is an integer from 1 to 60;
p is an integer from 2 to 6;
B represents a core of a z-valent, alkenyl-terminated polyfunctionalizing agent B(—V)$_z$ wherein:
z is an integer from 3 to 6; and each —V is a group comprising a terminal alkenyl group; and each —V'— is derived from the reaction of —V with a thiol; and each $R^6$ is independently a moiety comprising a terminal group of Formula (7):

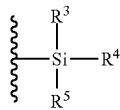
(7)

where $R^3$, $R^4$, and $R^5$ are each independently selected from a $C_{1-6}$ n-alkyl group, a $C_{3-6}$ branched alkyl group, a substituted $C_{1-6}$ n-alkyl group, and a phenyl group.

In certain embodiments of Formula (7), each of $R^3$, $R^4$, and $R^5$ is independently selected from a $C_{1-6}$ alkyl group, a phenyl group, and a $C_{1-6}$ chloroalkyl group. In certain embodiments of Formula (7), each of $R^3$, $R^4$, and $R^5$ is independently selected from $C_{1-6}$ alkyl, and in certain embodiments, $C_{1-3}$ alkyl. In certain embodiments of Formula (7), each of $R^3$, $R^4$, and $R^5$ is the same and is methyl, in certain embodiments, ethyl, and in certain embodiments, propyl. In certain embodiments of Formula (7), each of $R^3$, $R^4$, and $R^5$ is independently selected from ethyl, methyl, and propyl; and in certain embodiments, from ethyl and methyl. In certain embodiments of Formula (7), the substituent is selected from halogen, —OH, and —$NH_2$.

Various methods can be used to prepare silyl-blocked polythioethers of Formula (6) and Formula (6a). In certain embodiments, a silyl-blocked polythioether of Formula (6) and Formula (6a), may be prepared by reacting a thiol-terminated polythioether with a halosilane. Examples of suitable thiol-terminated polythioethers, and methods for their production are disclosed herein. Such thiol-terminated polythioethers may be difunctional, that is, linear polymers having two end groups, or polyfunctional, that is, branched polymers have three or more end groups. Suitable thiol-terminated polythioethers are commercially available, for example, as Permapol® P3.1E from PRC-DeSoto International Inc., Sylmar, Calif.

Silyl-blocked polythioethers provided by the present disclosure may be prepared by reacting any of the thiol-terminated polythioethers disclosed herein with a halosilane expressed by the general formula $(R^3)(R^4)R^5SiX$, wherein X represents a halogen atom such as Cl, Br, or I, and $R^3$, $R^4$, and $R^5$ are each independently selected from a $C_{1-6}$ n-alkyl group, a $C_{3-6}$ branched alkyl group, a substituted $C_{1-6}$ n-alkyl group, and a phenyl group. In certain embodiments of formula $(R^3)(R^4)R^5SiX$, each of $R^3$, $R^4$, and $R^5$ is the same and is methyl, in certain embodiments, ethyl, and in certain embodiments, propyl. In certain embodiments of formula $(R^3)(R^4)R^5SiX$, each of $R^3$, $R^4$, and $R^5$ is independently selected from ethyl, methyl, and propyl; and in certain embodiments, from ethyl and methyl. In certain embodiments of formula $(R^3)(R^4)R^5SiX$, X is Cl, in certain embodiments, Br, and in certain embodiments, X is I.

Examples of suitable halo silanes include trimethylchlorosilane, triethylchlorosilane, tripropylchlorosilane, tributylchlorosilane, trimethylbromosilane, triethylbromosilane, triisopropylbromosilane, tributylbromosilane, trimethyliodosilane, triethyliodosilane, tripropyliodosilane, tributyliodosilane, trimethylfluorosilane, triethylfluorosilane, tripropylfluorosilane, tributylfluorosilane, dimethylphenylchlorosilane, chloromethyldimethylchlorosilane, and combinations of any of the foregoing.

In certain embodiments, a halosilane may be reacted with a thiol-terminated polythioether and/or polysulfide in an amount sufficient to provide a silyl-blocked polythioether and/or polysulfide comprising at least two groups having Formula (7). In certain embodiments, the molar ratio of halosilanes to thiol groups is at least 1:1, such as from 1.05 to 2.5:1, from 1.05 to 2.0:1, from 1.5 to 3.0:1, from 2 to 3.5:1, and in certain embodiments, from 2.5 to 3.5:1.

Silyl-blocked polythioethers provided by the present disclosure may be prepared by combining one or more thiol-terminated polythioethers and one or more halosilanes, optionally in the presence of a solvent, such as toluene, and/or an agent to neutralize the halogen acid reaction by product (such as a tertiary alkylamine, including those according to the formula $R_3N$, wherein each R may be the same or different and is a $C_{1-6}$ alkyl), and carrying out the reaction at a temperature from 25° C. to 120° C. for a time from 2 to 24 hours. In certain embodiments, the reaction may be carried out at a temperature from 70° C. to 90° C. for a time from 2 to 6 hours. The Examples herein are illustrative of suitable methods for carrying out this reaction.

As a result, suitable methods for making a silyl-blocked polythioether suitable for use in the compositions provided by the present disclosure comprise reacting a thiol-terminated polythioether including thiol-terminated polythioethers provided by the present disclosure, with a halo silane. In these methods, a thiol-terminated polythioether comprises a structure having the Formula (1):

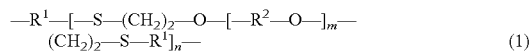
(1)

wherein (i) each $R^1$ is independently selected from a $C_{2-10}$ n-alkanediyl group, a $C_{3-6}$ branched alkanediyl group, a $C_{6-8}$ cycloalkanediyl group, a $C_{6-10}$ alkanecycloalkanediyl group, a heterocyclic group, a $—[(—CH_2—)_p—X—]_q—(CH_2)_r—$ group, and a $—[(—CH_2—)_p—X—]_q—(CH_2)_r—$ group in which at least one $—CH_2—$ unit is substituted with a methyl group; (ii) each $R^2$ is independently selected from a $C_{2-10}$ n-alkanediyl group, a $C_{3-6}$ branched alkanediyl group, a $C_{6-8}$ cycloalkanediyl group, a $C_{6-14}$ alkanecycloalkanediyl group, a heterocyclic group, and a $—[(—CH_2—)_p—X—]_q—(CH_2)_r—$ group; (iii) each X is independently selected from —O—, —S—, and a —$NR^6$— group, in which $R^6$ is selected from hydrogen and a methyl group; (iv) m ranges from 0 to 50; (v) n is an integer ranging from 1 to 60; (vi) p is an integer ranging from 2 to 6; (vii) q is an integer ranging from 1 to 5; and (viii) r is an integer ranging from 2 to 10.

In certain embodiments, a trialkylsilane-terminated polythioether comprises the reaction product of reactants comprising:

(a) a polythioether selected from a thiol-terminated polythioether of Formula (2), a thiol-terminated polythioether of Formula (2a), and a combination thereof:

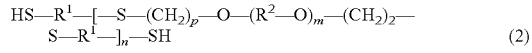
(2)

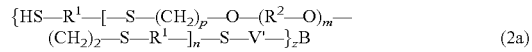
(2a)

wherein:
each $R^1$ is independently selected from $C_{2-6}$ alkanediyl, $C_{6-8}$ cycloalkanediyl, $C_{6-10}$ alkanecycloalkanediyl, $C_{5-8}$ heterocycloalkanediyl, and $—[(—CHR^3—)_s—X—]_q—(—CHR^3—)_r—$; wherein:
s is an integer from 2 to 6;
q is an integer from 1 to 5;

r is an integer from 2 to 10;
each $R^3$ is independently selected from hydrogen and methyl; and
each X is independently selected from —O—, —S—, and —NHR—, wherein R is selected from hydrogen and methyl;
each $R^2$ is independently selected from $C_{1-10}$ alkanediyl, $C_{6-8}$ cycloalkanediyl, $C_{6-14}$ alkanecycloalkanediyl, and —[(—CHR$^3$—)$_s$—X—]$_q$—(—CHR$^3$—)$_r$—, wherein s, q, r, $R^3$, and X are as defined above;
m is an integer from 0 to 50;
n is an integer from 1 to 60;
p is an integer from 2 to 6;
B represents a core of a z-valent, alkenyl-terminated polyfunctionalizing agent B(—V)$_z$ wherein:
z is an integer from 3 to 6; and
each —V is a group comprising a terminal alkenyl group; and
each —V'— is derived from the reaction of —V with a thiol; and
(b) a halosilane of Formula (8):

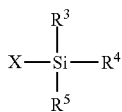

(8)

wherein:
X is halogen; and
$R^3$, $R^4$, and $R^5$ are each independently selected from a $C_{1-6}$ n-alkyl group, a $C_{3-6}$ branched alkyl group, a substituted $C_{1-6}$ n-alkyl group, and a phenyl group.

In certain embodiments of compounds of Formula (2a), z is 3 and the polyfunctionalizing agent is a trifunctionalizing agent.

In certain embodiments, a thiol-terminated sulfur-containing polymer comprises a thiol-terminated polysulfide, which may be reacted with a trialkylsilane to provide a trialkylsilane-terminated polysulfide. As used herein, a polysulfide refers to a polymer that contains one or more disulfide linkages, i.e., —[S—S]— linkages, in the polymer backbone and/or in pendant positions on the polymer chain. Often, the polysulfide polymer will have two or more sulfur-sulfur linkages. Suitable polysulfides are commercially available from Akzo Nobel under the name Thioplast®. Thioplast® products are available in a wide range of molecular weights ranging, for example, from less than 1,100 to over 8,000, with molecular weight being the average molecular weight in grams per mole. In some cases, the polysulfide has a number average molecular weight of 1,000 to 4,000. The crosslink density of these products also varies, depending on the amount of crosslinking agent used. The —SH content, i.e., thiol or mercaptan content, of these products can also vary. The mercaptan content and molecular weight of the polysulfide can affect the cure speed of the polymer, with cure speed increasing with molecular weight.

In certain embodiments provided by the present disclosure, in addition to or in lieu of, a polysulfide, a composition comprises: (a) from 90 mole percent to 25 mole percent of mercaptan terminated disulfide polymer of the formula HS(RSS)$_m$R—SH; and (b) from 10 mole percent to 75 mole percent of diethyl formal mercaptan terminated polysulfide polymer of the formula HS(RSS)—R—SH, wherein R is —C$_2$H$_4$—O—CH$_2$—O—C$_2$H$_4$—; R is a divalent member selected from alkyl of from 2 to 12 carbon atoms, alkyl thioether of from 4 to 20 carbon atoms, alkyl ether of from 4 to 20 carbon atoms and one oxygen atom, alkyl ether of from 4 to 20 carbon atoms and from 2 to 4 oxygen atoms each of which is separated from the other by at least 2 carbon atoms, alicyclic of from 6 to 12 carbon atoms, and aromatic lower alkyl; and the value of m and n is such that the diethyl formal mercaptan terminated polysulfide polymer and the mercaptan terminated disulfide polymer have an average molecular weight of from 1,000 Daltons to 4,000 Daltons, such as 1,000 Daltons to 2,500 Daltons. Such polymeric mixtures are described in U.S. Pat. No. 4,623,711 at col. 4, line 18 to col. 8, line 35, the cited portion of which being incorporated by reference. In some cases, R in the above formula is —CH$_2$—CH$_2$—; —C$_2$H$_4$—O—C$_2$H$_4$—; —C$_2$H$_4$—S—C$_2$H$_4$—; —C$_2$H$_4$—O—C$_2$H$_4$—O—C$_2$H$_4$—; or —CH$_2$—C$_6$H$_4$—CH$_2$—.

Trialkylsilane-terminated polysulfides and their preparation are disclosed, for example, in U.S. Pat. No. 4,902,736. In certain embodiments, a polysulfide comprises a thiol-terminated polysulfide such as those commercially available from Akzo Nobel under the name Thioplast® and from Toray under the name Thiokol®-LP.

The terminal thiol groups of a thiol-terminated polysulfide may be converted to trialkylsilane groups by reacting, for example, the thiol-terminated polysulfide with a halo silane, such as a halosilane of Formula (9) in the presence of a basic catalyst including an amine catalyst such as triethylamine. Examples of suitable halogenosilanes include trimethylchlorosilane, trimethylbromosilane, trimethyliodosilane, dimethylphenylchlorosilane, and chloromethyldimethylchlorosilane. Examples of suitable halogenosilanes further include triethylchlorosilane, triethylbromosilane, triethylio do silane, diethylphenylchlorosilane, and chloroethyldiethylchlorosilane. Thiol groups may also be converted to trialkylsilane groups by reacting a thiol-terminated polysulfide with a suitable acetoamide or urea such as N,O-bis(trimethylsilyl)acetoamide or N,N'-bis(trimethylsilyl)urea. Another method includes reacting a thiol-terminated polysulfide with a silazane such as hexamethyldisilazane in the presence of an appropriate catalyst such as imidazole or saccharin.

Polyepoxide

Curing agents useful in compositions provided by the present disclosure include those that are reactive with the unblocked thiol terminal groups of the sulfur-containing polymer.

In certain embodiments, a curing agent comprises an epoxy curing agent such as a polyepoxide, e.g., an epoxide having two or more epoxy groups. Examples of suitable polyepoxides include, for example, polyepoxide resins such as hydantoin diepoxide, diglycidyl ether of bisphenol-A, diglycidyl ether of bisphenol-F, Novolac® type epoxides such as DEN™ 438 (available from Dow), certain epoxidized unsaturated resins, and combinations of any of the foregoing. A polyepoxide refers to a compound having two or more reactive epoxy groups. In certain embodiments, a polyepoxide comprises a diepoxide and in certain embodiments a diepoxide is selected from EPON® 828, DEN® 432, and a combination thereof.

In certain embodiments, a polyepoxide curing agent comprises an epoxy-functional polymer. Examples of suitable epoxy-functional polymers include the epoxy-functional polyformal polymers disclosed in U.S. patent application Ser. No. 13/050,988 and epoxy-functional polythioether polymers disclosed in U.S. Pat. No. 7,671,145. In general, when used as a curing agent, an epoxy-functional polymer has a molecular weight less than about 2,000 Daltons, less than about 1,500, Daltons, less than about 1,000 Daltons, and in certain embodiments, less than about 500 Daltons.

In certain embodiments, a polyepoxide comprises a polyfunctional sulfur-containing epoxide such as disclosed in U.S. patent application Ser. No. 13/529,208 filed on Jun. 21, 2012, which is incorporated by reference.

In such compositions, a polyepoxide may comprise about 0.5 wt % to about 20 wt % of the composition, from about 1 wt % to about 10 wt %, from about 2 wt % to about 8 wt %, from about 2 wt % to about 6 wt %, and in certain embodiments, from about 3 wt % to about 5 wt %, where wt % is based on the total solids weight of the composition.

Controlled-Release Amine Catalyst

Controlled-release amine catalysts have little or no activity until released, either chemically or physically. In certain embodiments, a controlled-release amine catalyst may be released upon exposure to heat or at ambient temperature by diffusion. Controlled release amine catalysts suitable for use in compositions provided by the present disclosure include, for example, amine catalysts that are incorporated into a matrix encapsulant.

Matrix encapsulation is a process by which droplets or particles of liquid or solid material are trapped among side chains of a crystalline polymer. With increased temperature, the crystalline polymer becomes amorphous and releases the droplets or particles into the medium. Matrix encapsulants provided by the present disclosure comprise a crystalline matrix material incorporating droplets or particles comprising an amine catalyst. Thus, the rate of reaction is to some extent controlled by thermally dependent diffusion of the amine catalyst from the crystalline polymer. The crystalline polymers may have a sharp well-defined melting point or may exhibit a melting point range. The use of waxy polymers for encapsulation of amine catalysts used in Michael addition compositions is disclosed in U.S. Application Publication No. 2007/0173602.

Examples of suitable matrix encapsulants include Intelimer® polymers (Air Products), such as Intelimer® 13-1 and Intelimer® 13-6. The properties of Intelimer® polymers is disclosed in Lowry et al., Cure evaluation of Intelimer® latent curing agents for thermoset resin applications, presented at the Thermoset Resin Formulators Association Meeting, Chicago, Ill., Sep. 15-16, 2008.

A matrix encapsulant may be selected to release the amine catalyst following a brief high-temperature exposure such as for less than 10 minutes, less than 5 minutes, or less than 2 minutes. The temperature may be above the glass transition temperature of the matrix encapsulant. During this brief temperature excursion, amine catalyst is released from the matrix and diffuses into the reactive polymer components. The composition may then be cured at ambient temperature or may be heated. The composition will fully cure within several days such as from about 3 days to about 7 days.

Amine catalysts may be incorporated into a matrix encapsulant by blending at a temperature above the melt temperature of the matrix encapsulant, rapidly cooling the mixture, and grinding the solid to a powder. In certain embodiments, the average particle size is less than 200 µm, less than 150 µm, less than 100 µm, less than 50 µm, and in certain embodiments, less than 25 µm.

In certain embodiments, a composition may comprise from 0.1 wt % to 25 wt %, from 1 wt % to 15 wt %, and in certain embodiments, from 5 wt % to 10 wt % of a matrix encapsulant comprising an amine catalyst. This correlates to about 0.01 wt % to 2 wt %, from 0.05 wt % to 1.5 wt %, and in certain embodiments, from 0.5 wt % to 1 wt % of an amine catalyst.

In certain embodiments, a matrix encapsulant suitable for use in compositions provided by the present disclosure comprises a ratio (wt %/wt %) of wt % amine catalyst to wt % matrix polymer from 1 to 15, from 2 to 10, and in certain embodiments, from 5 to 8.

Amine catalysts useful in compositions provided by the present disclosure include 1,8-diazabicyclo-5,4-0-undecene-7 and 1,4-diazabicyclo[2.2.2]octane (DABCO). Suitable amine catalysts also include amidine catalysts such as tetramethylguanidine (TMG), diazabicyclononene (DBN), diazabicycloundecene (DBU) and imidazoles; and bicyclic guanidines such as 1,5,7,-triazabicyclo[4.4.0]dec-5-ene (TBD) and 1,5,7,-triazabicyclo[4.4.0]dec-5-ene, 7-methyl (MTBD).

Compositions may comprise one or more different types of amine catalyst.

When released, controlled-release amine catalysts provided by the present disclosure catalyze the reaction between a polythioether containing at least two terminal groups that are reactive with a compound comprising at least two epoxy groups.

In controlled-release compositions provided by the present disclosure, the pot life of a composition can be greater than 2 days if the catalyst is not thermally released. When the amine catalyst is released from the matrix encapsulant by heat, the cure time can be less than 72 hours, less than 60 hours, less than 48 hours, less than 36 hours, and in certain embodiments less than 24 hours. In certain embodiments, the matrix encapsulant is not heated and the incorporated amine catalyst slowly diffuses from the matrix encapsulant at ambient temperature over a period of several days such as from 2 to 5 days.

Properties

For aerospace sealant applications it is desirable that a sealant meet the requirements of Mil-S-22473E (Sealant Grade C) at a cured thickness of 20 mils, exhibit an elongation greater than 200%, a tensile strength greater than 250 psi, and excellent fuel resistance, and maintain these properties over a wide temperature range from −67° F. to 360° F. In general, the visual appearance of the sealant is not an important attribute. Prior to cure, it is desirable that the mixed components have a pot life of at least 96 hours and have a cure time less than 2 weeks, although for certain applications, it can be useful to have a much faster curing rate, for example, less than 24 hours. Pot life refers to the time period the composition remains workable for application at ambient temperatures after the catalyst is released.

In certain embodiments, compositions comprising a thiol-terminated sulfur-containing polymer, a polyepoxide curing agent and a matrix encapsulated amine catalyst, after exposing the composition to a temperature of 200° F. for 5 minutes, exhibit a shelf life of less than about 8 hours, and a cure time of about 7 days at ambient temperature and humidity. The pot life for a corresponding composition without heat treatment is more than 2 weeks. In certain of such embodiments, the thiol-terminated polythioether is Permapol® 3.1E and the polyepoxide is EPON® 828, DEN® 431, or a combination thereof.

Formulations

Compositions provided by the present disclosure may comprise one or more additional components suitable for use in aerospace sealants and depend at least in part on the desired performance characteristics of the cured sealant under conditions of use.

In certain embodiments, compositions provided by the present disclosure comprise one or more than one adhesion promoters. A one or more additional adhesion promoter may be present in amount from 0.1 wt % to 15 wt % of a composition, less than 5 wt %, less than 2 wt %, and in certain embodiments, less than 1 wt %, based on the total dry weight of the composition. Examples of adhesion promoters include phenolics, such as Methylon® phenolic resin, and organosilanes, such as epoxy, mercapto or amino functional silanes, such as Silquest® A-187 and Silquest® A-1100. Other useful adhesion promoters are known in the art.

Suitable adhesion promoters include sulfur-containing adhesion promoters such as those disclosed in U.S. application Ser. No. 13/529,183, filed on Jun. 21, 2012, which is incorporated by reference.

Compositions provided by the present disclosure may comprise one or more different types of filler. Suitable fillers include those commonly known in the art, including inorganic fillers, such as carbon black and calcium carbonate ($CaCO_3$), silica, polymer powders, and lightweight fillers. Suitable lightweight fillers include, for example, those described in U.S. Pat. No. 6,525,168. In certain embodiments, a composition includes 5 wt % to 60 wt % of the filler or combination of fillers, 10 wt % to 50 wt %, and in certain embodiments, from 20 wt % to 40 wt %, based on the total dry weight of the composition. Compositions provided by the present disclosure may further include one or more colorants, thixotropic agents, accelerators, fire retardants, adhesion promoters, solvents, masking agents, or a combination of any of the foregoing. As can be appreciated, fillers and additives employed in a composition may be selected so as to be compatible with each other as well as the polymeric component, curing agent, and or catalyst.

In certain embodiments, compositions provided by the present disclosure include low density filler particles. As used herein, low density, when used with reference to such particles means that the particles have a specific gravity of no more than 0.7, in certain embodiments no more than 0.25, and in certain embodiments, no more than 0.1. Suitable lightweight filler particles often fall within two categories—microspheres and amorphous particles. The specific gravity of microspheres may range from 0.1 to 0.7 and include, for example, polystyrene foam, microspheres of polyacrylates and polyolefins, and silica microspheres having particle sizes ranging from 5 to 100 microns and a specific gravity of 0.25 (Eccospheres®). Other examples include alumina/silica microspheres having particle sizes in the range of 5 to 300 microns and a specific gravity of 0.7 (Fillite®), aluminum silicate microspheres having a specific gravity of from about 0.45 to about 0.7 (Z-Light®), calcium carbonate-coated polyvinylidene copolymer microspheres having a specific gravity of 0.13 (Dualite® 6001AE), and calcium carbonate coated acrylonitrile copolymer microspheres such as Dualite® E135, having an average particle size of about 40 µm and a density of 0.135 g/cc (Henkel). Suitable fillers for decreasing the specific gravity of the composition include, for example, hollow microspheres such as Expancel® microspheres (available from AkzoNobel) or Dualite® low density polymer microspheres (available from Henkel). In certain embodiments, compositions provided by the present disclosure include lightweight filler particles comprising an exterior surface coated with a thin coating, such as those described in U.S. Publication No. 2010/0041839 at paragraphs [0016]-[0052], the cited portion of which is incorporated by reference.

In certain embodiments, a low density filler comprises less than 2 wt % of a composition, less than 1.5 wt %, less than 1.0 wt %, less than 0.8 wt %, less than 0.75 wt %, less than 0.7 wt % and in certain embodiments, less than 0.5 wt % of a composition, where wt % is based on the total dry solids weight of the composition.

In certain embodiments, compositions provided by the present disclosure comprise at least one filler that is effective in reducing the specific gravity of the composition. In certain embodiments, the specific gravity of a composition is from 0.8 to 1, 0.7 to 0.9, from 0.75 to 0.85, and in certain embodiments, is 0.8. In certain embodiments, the specific gravity of a composition is less than about 0.9, less than about 0.8, less than about 0.75, less than about 0.7, less than about 0.65, less than about 0.6, and in certain embodiments, less than about 0.55.

In certain embodiments, compositions provided by the present disclosure comprise an electrically conductive filler. Electrical conductivity and EMI/RFI shielding effectiveness can be imparted to composition by incorporating conductive materials within the polymer. The conductive elements can include, for example, metal or metal-plated particles, fabrics, meshes, fibers, and combinations thereof. The metal can be in the form of, for example, filaments, particles, flakes, or spheres. Examples of metals include copper, nickel, silver, aluminum, tin, and steel. Other conductive materials that can be used to impart EMI/RFI shielding effectiveness to polymer compositions include conductive particles or fibers comprising carbon or graphite. Conductive polymers such as polythiophenes, polypyrroles, polyaniline, poly(p-phenylene) vinylene, polyphenylene sulfide, polyphenylene, and polyacetylene can also be used.

Examples of electrically non-conductive fillers include materials such as, but not limited to, calcium carbonate, mica, polyamide, fumed silica, molecular sieve powder, microspheres, titanium dioxide, chalks, alkaline blacks, cellulose, zinc sulfide, heavy spar, alkaline earth oxides, alkaline earth hydroxides, and the like. Fillers also include high band gap materials such as zinc sulfide and inorganic barium compounds. In certain embodiments, an electrically conductive base composition can comprise an amount of electrically non-conductive filler ranging from 2 wt % to 10 wt % based on the total weight of the base composition, and in certain embodiments, can range from 3 wt % to 7 wt %. In certain embodiments, a curing agent composition can comprise an amount of electrically non-conductive filler ranging from less than 6 wt % and in certain embodiments ranging from 0.5% to 4% by weight, based on the total weight of the curing agent composition.

Fillers used to impart electrical conductivity and EMI/RFI shielding effectiveness to polymer compositions are well known in the art. Examples of electrically conductive fillers include electrically conductive noble metal-based fillers such as pure silver; noble metal-plated noble metals such as silver-plated gold; noble metal-plated non-noble metals such as silver plated cooper, nickel or aluminum, for example, silver-plated aluminum core particles or platinum-plated copper particles; noble-metal plated glass, plastic or ceramics such as silver-plated glass microspheres, noble-metal plated aluminum or noble-metal plated plastic microspheres; noble-metal plated mica; and other such noble-metal conductive fillers. Non-noble metal-based materials can also be used and include, for example, non-noble metal-plated non-noble metals such as copper-coated iron particles or nickel plated copper; non-noble metals, e.g., copper, aluminum, nickel, cobalt; non-noble-metal-plated-non-metals, e.g., nickel-plated graphite and non-metal materials such as carbon black and graphite. Combinations of electrically conductive fillers can also be used to meet the desired conductivity, EMI/RFI shielding effectiveness, hardness, and other properties suitable for a particular application.

The shape and size of the electrically conductive fillers used in compositions of the present disclosure can be any appropriate shape and size to impart EMI/RFI shielding effectiveness to the cured composition. For example, fillers can be of any shape that is generally used in the manufacture of electrically conductive fillers, including spherical, flake, platelet, particle, powder, irregular, fiber, and the like. In certain sealant compositions of the disclosure, a base composition can comprise Ni-coated graphite as a particle, powder or flake. In certain embodiments, the amount of Ni-coated graphite in a base composition can range from 40 wt % to 80 wt %, and in certain embodiments can range from 50 wt % to 70 wt %, based on the total weight of the base composition. In certain embodiments, an electrically conductive filler can comprise Ni fiber. Ni fiber can have a diameter ranging from 10 µm to 50 µm and have a length ranging from 250 µm to 750 µm. A base composition can comprise, for example, an amount of Ni fiber ranging from 2 wt % to 10 wt %, and in certain embodiments, from 4 wt % to 8 wt %, based on the total weight of the base composition.

Carbon fibers, particularly graphitized carbon fibers, can also be used to impart electrical conductivity to compositions of the present disclosure. Carbon fibers formed by vapor phase pyrolysis methods and graphitized by heat treatment and which are hollow or solid with a fiber diameter ranging from 0.1 micron to several microns, have high electrical conductivity. As disclosed in U.S. Pat. No. 6,184,280, carbon microfibers, nanotubes or carbon fibrils having an outer diameter of less than 0.1 µm to tens of nanometers can be used as electrically conductive fillers. An example of graphitized carbon fiber suitable for conductive compositions of the present disclosure include Panex® 3OMF (Zoltek Companies, Inc., St. Louis, Mo.), a 0.921 µm diameter round fiber having an electrical resistivity of 0.00055 Ω-cm.

The average particle size of an electrically conductive filler can be within a range useful for imparting electrical conductivity to a polymer-based composition. For example, in certain embodiments, the particle size of the one or more fillers can range from 0.25 µm to 250 µm, in certain embodiments can range from 0.25 µm to 75 µm, and in certain embodiments can range from 0.25 µm to 60 µm. In certain embodiments, composition of the present disclosure can comprise Ketjenblack® EC-600 JD (Akzo Nobel, Inc., Chicago, Ill.), an electrically conductive carbon black characterized by an iodine absorption of 1000-11500 mg/g (J0/84-5 test method), and a pore volume of 480-510 $cm^3$/100 gm (DBP absorption, KTM 81-3504). In certain embodiments, an electrically conductive carbon black filler is Black Pearls 2000 (Cabot Corporation, Boston, Mass.).

In certain embodiments, electrically conductive polymers can be used to impart or modify the electrical conductivity of compositions of the present disclosure. Polymers having sulfur atoms incorporated into aromatic groups or adjacent to double bonds, such as in polyphenylene sulfide, and polythiophene, are known to be electrically conductive. Other electrically conductive polymers include, for example, polypyrroles, polyaniline, poly(p-phenylene) vinylene, and polyacetylene. In certain embodiments, the sulfur-containing polymers forming a base composition can be polysulfides and/or polythioethers. As such, the sulfur-containing polymers can comprise aromatic sulfur groups and sulfur atoms adjacent to conjugated double bonds such as vinylcyclohexene-dimercaptodioxaoctane groups, to enhance the electrical conductivity of the compositions of the present disclosure.

Compositions of the present disclosure can comprise more than one electrically conductive filler and the more than one electrically conductive filler can be of the same or different materials and/or shapes. For example, a sealant composition can comprise electrically conductive Ni fibers, and electrically conductive Ni-coated graphite in the form of powder, particles or flakes. The amount and type of electrically conductive filler can be selected to produce a sealant composition which, when cured, exhibits a sheet resistance (four-point resistance) of less than 0.50 Ω/$cm^2$, and in certain embodiments, a sheet resistance less than 0.15 Ω/$cm^2$. The amount and type of filler can also be selected to provide effective EMI/RFI shielding over a frequency range of from 1 MHz to 18 GHz for an aperture sealed using a sealant composition of the present disclosure.

Galvanic corrosion of dissimilar metal surfaces and the conductive compositions of the present disclosure can be minimized or prevented by adding corrosion inhibitors to the composition, and/or by selecting appropriate conductive fillers. In certain embodiments, corrosion inhibitors include strontium chromate, calcium chromate, magnesium chromate, and combinations thereof. U.S. Pat. No. 5,284,888 and U.S. Pat. No. 5,270,364 disclose the use of aromatic triazoles to inhibit corrosion of aluminum and steel surfaces. In certain embodiments, a sacrificial oxygen scavenger such as Zn can be used as a corrosion inhibitor. In certain embodiments, the corrosion inhibitor can comprise less than 10% by weight of the total weight of the electrically conductive composition. In certain embodiments, the corrosion inhibitor can comprise an amount ranging from 2% by weight to 8% by weight of the total weight of the electrically conductive composition. Corrosion between dissimilar metal surfaces can also be minimized or prevented by the selection of the type, amount, and properties of the conductive fillers comprising the composition.

In certain embodiments, a sulfur-containing polymer comprises from about 50 wt % to about 90 wt % of a composition, from about 60 wt % to about 90 wt %, from about 70 wt % to about 90 wt %, and in certain embodiments, from about 80 wt % to about 90 wt % of the composition, where wt % is based on the total dry solids weight of the composition.

A composition may also include any number of additives as desired. Examples of suitable additives include plasticizers, pigments, surfactants, adhesion promoters, thixotropic agents, fire retardants, masking agents, and accelerators (such as amines, including 1,4-diazabicyclo[2.2.2]octane, DABCO®), and combinations of any of the foregoing. When used, the additives may be present in a composition in an amount ranging, for example, from about 0% to 60% by weight. In certain embodiments, additives may be present in a composition in an amount ranging from about 25% to 60% by weight.

Uses

Compositions provided by the present disclosure may be used, for example, in sealants, coatings, encapsulants, and potting compositions. A sealant includes a composition capable of producing a film that has the ability to resist operational conditions, such as moisture and temperature, and at least partially block the transmission of materials, such as water, fuel, and other liquid and gases. A coating composition includes a covering that is applied to the surface of a substrate to, for example, improve the properties of the substrate such as the appearance, adhesion, wettability, corrosion resistance, wear resistance, fuel resistance, and/or abrasion resistance. A potting composition includes a material useful in an electronic assembly to provide resistance to shock and vibration and to exclude moisture and corrosive agents. In certain embodiments, sealant compositions provided by the present disclosure are useful, e.g., as aerospace sealants and as linings for fuel tanks.

In certain embodiments, compositions, such as sealants, may be provided as multi-pack compositions, such as two-pack compositions, wherein one package comprises one or more sulfur-containing polymers provided by the present disclosure and a second package comprises one or more polyepoxides. Additives and/or other materials may be added to either package as desired or necessary. The two packages may be combined and mixed prior to use. In certain embodiments, the pot life of the one or more mixed sulfur-containing polymers and polyepoxides is at least 12 hours, at least 24 hours, at least 48 hours, and in certain embodiments, more than 48 hours, where pot life refers to the period of time the mixed composition remains suitable for use as a sealant after mixing.

In certain embodiments, for storage and transportation, the composition components, including a silyl-blocked sulfur-containing polymer and polyepoxide curing agent, are combined in a container and sealed from moisture and protected from heat. While sealed from moisture in the container, the composition is stable and remains substantially uncured for an extended time period.

In certain embodiments, a composition cures to a tack-free cure within about 24 hours to about 72 hours after the useful working time at a temperature of about 25° C. or higher. The time to form a viable seal using moisture-curable compositions provide by the present disclosure can depend on several factors as can be appreciated by those skilled in the art, and as defined by the requirements of applicable standards and specification. In general, curable composition provided by the present disclosure develop adhesion strength within about 3 days to about 7 days following application to a surface. In general, full adhesion strength as well as other properties of cured compositions provide by the present disclosure become fully developed within 7 days following mixing and application of a curable composition to a surface.

Compositions, including sealants, provided by the present disclosure may be applied to any of a variety of substrates. Examples of substrates to which a composition may be applied include metals such as titanium, stainless steel, and aluminum, any of which may be anodized, primed, organic-coated or chromate-coated; epoxy; urethane; graphite; fiberglass composite; Kevlar®; acrylics; and polycarbonates. In certain embodiments, compositions provided by the present disclosure may be applied to a coating on a substrate, such as a polyurethane coating.

Compositions provided by the present disclosure may be applied directly onto the surface of a substrate or over an underlayer by any suitable coating process known to those of ordinary skill in the art.

Furthermore, methods are provided for sealing an aperture utilizing a composition provided by the present disclosure. These methods comprise, for example, applying a composition provided by the present disclosure to a surface to seal an aperture, and curing the composition. In certain embodiments, a method for sealing an aperture comprises (a) applying a sealant composition provided by the present disclosure to one or more surfaces defining an aperture, (b) assembling the surfaces defining the aperture, and (c) curing the sealant, to provide a sealed aperture.

In certain embodiments, a composition may be cured under ambient conditions, where ambient conditions refers to a temperature from 20° C. to 25° C., and atmospheric humidity. In certain embodiments, a composition may be cured under conditions encompassing a temperature from a 0° C. to 100° C. and humidity from 0% relative humidity to 100% relative humidity. In certain embodiments, a composition may be cured at a higher temperature such as at least 30° C., at least 40° C., and in certain embodiments, at least 50° C. In certain embodiments, a composition may be cured at room temperature, e.g., 25° C. In certain embodiments, a composition may be cured upon exposure to actinic radiation, such as ultraviolet radiation. As will also be appreciated, the methods may be used to seal apertures on aerospace vehicles including aircraft and aerospace vehicles.

The time to form a viable seal using curable compositions of the present disclosure can depend on several factors as can be appreciated by those skilled in the art, and as defined by the requirements of applicable standards and specifications. In general, curable compositions of the present disclosure develop adhesion strength within about 3 days to about 7 days following mixing and application to a surface. In general, full adhesion strength as well as other properties of cured compositions of the present disclosure becomes fully developed within 7 days following mixing and application of a curable composition to a surface.

Cured compositions disclosed herein, such as cured sealants, exhibit properties acceptable for use in aerospace applications. In general, it is desirable that sealants used in aviation and aerospace applications exhibit the following properties: peel strength greater than 20 pounds per linear inch (pli) on Aerospace Material Specification (AMS) 3265B substrates determined under dry conditions, following immersion in JRF for 7 days, and following immersion in a solution of 3% NaCl according to AMS 3265B test specifications; tensile strength between 300 pounds per square inch (psi) and 400 psi; tear strength greater than 50 pounds per linear inch (pli); elongation between 250% and 300%; and hardness greater than 40 Durometer A. These and other cured sealant properties appropriate for aviation and aerospace applications are disclosed in AMS 3265B, the entirety of which is incorporated by reference. It is also desirable that, when cured, compositions of the present disclosure used in aviation and aircraft applications exhibit a percent volume swell not greater than 25% following immersion for one week at 60° C. (140° F.) and ambient pressure in JRF type 1. Other properties, ranges, and/or thresholds may be appropriate for other sealant applications.

In certain embodiments, therefore, compositions provided by the present disclosure are fuel-resistant. As used herein, the term "fuel resistant" means that a composition, when applied to a substrate and cured, can provide a cured product, such as a sealant, that exhibits a percent volume swell of not greater than 40%, in some cases not greater than 25%, in some cases not greater than 20%, in yet other cases not more than 10%, after immersion for one week at 140° F. (60° C.) and ambient pressure in Jet Reference Fluid (JRF) Type I according to methods similar to those described in ASTM D792 (American Society for Testing and Materials) or AMS 3269 (Aerospace Material Specification). Jet Reference Fluid JRF Type I, as employed for determination of fuel resistance, has the following composition: toluene: 28±1% by volume; cyclohexane (technical): 34±1% by volume; isooctane: 38±1% by volume; and tertiary dibutyl disulfide: 1±0.005% by volume (see AMS 2629, issued Jul. 1, 1989, §3.1.1 etc., available from SAE (Society of Automotive Engineers)).

In certain embodiments, compositions provided herein provide a cured product, such as a sealant, exhibiting a tensile elongation of at least 100% and a tensile strength of at least 400 psi when measured in accordance with the procedure described in AMS 3279, §3.3.17.1, test procedure AS5127/1, §7.7.

In certain embodiments, compositions provide a cured product, such as a sealant, that exhibits a lap shear strength of greater than 200 psi, such as at least 220 psi, at least 250 psi, and, in some cases, at least 400 psi, when measured according to the procedure described in SAE AS5127/1 paragraph 7.8.

In certain embodiments, a cured sealant comprising a composition provided by the present disclosure meets or exceeds the requirements for aerospace sealants as set forth in AMS 3277.

Apertures, including apertures of aerospace vehicles, sealed with compositions provided by the present disclosure are also disclosed.

In certain embodiments, an electrically conductive sealant composition provided by the present disclosure exhibits the following properties measured at room temperature following exposure at 500° F. for 24 hours: a surface resistivity of less than 1 ohms/square, a tensile strength greater than 200 psi, an elongation greater than 100%, and a cohesive failure of 100% measured according to MIL-C-27725.

In certain embodiments, a cured sealant provided by the present disclosure exhibits the following properties when cured for 2 days at room temperature, 1 day at 140° F., and 1 day at 200° F.: a dry hardness of 49, a tensile strength of 428 psi, and an elongation of 266%; and after 7 days in JRF, a hardness of 36, a tensile strength of 312 psi, and an elongation of 247%.

In certain embodiments, compositions provided by the present disclosure exhibit a Shore A hardness (7-day cure) greater than 10, greater than 20, greater than 30, and in certain embodiments, greater than 40; a tensile strength greater than 10 psi, greater than 100 psi, greater than 200 psi, and in certain embodiments, greater than 500 psi; an elongation greater than 100%, greater than 200%, greater than 500%, and in certain embodiments, greater than 1,000%; and a swell following exposure to JRF (7 days) less than 20%.

EXAMPLES

Embodiments provided by the present disclosure are further illustrated by reference to the following examples, which describe the synthesis, properties, and uses of certain sulfur-containing polymers, polyepoxides, and controlled release amine catalysts; and compositions comprising sulfur-containing polymers, polyepoxides, and controlled-release amine catalysts. It will be apparent to those skilled in the art that many modifications, both to materials, and methods, may be practiced without departing from the scope of the disclosure.

Example 1

Controlled-Release Catalyst Preparation 9.37 grams of Intelimer® 13-6 (from Air Products and Chemicals, Allentown, Pa.) and 0.63 gram of 1,8-diazabicyclo-5,4,0-undecene-7 (DBU) were blended at 80° C. for 30 minutes. The mixture was rapidly cooled to room temperature and then ground to powders with an average particle size of 20 micron to 50 micron.

Example 2

Controlled-Release Catalyst Preparation 9.00 grams of Intelimer® 13-6 (from Air Products and Chemicals, Allentown, Pa.) and 1.00 gram of 1,8-diazabicyclo-5,4,0-undecene-7 (DBU) were blended at 80° C. for 30 minutes. The mixture was rapidly cooled to room temperature and then ground to powders.

Example 3

Controlled-Release Catalyst Preparation 9.00 grams of Intelimer® 13-6 (from Air Products and Chemicals, Allentown, Pa.) and 1.00 gram of DABCO 33-LV (from Air Products and Chemicals, Allentown, Pa.) were blended at 80° C. for 30 minutes. The mixture was rapidly cooled to room temperature and then ground to powders.

Example 4

Synthesis of Thiol-terminated Polythioether Polymer

In a 2 L flask, 524.8 g (3.32 mol) of diethylene glycol divinyl ether (DEG-DVE) and 706.7 g (3.87 mol) of dimercaptodioxaoctane (DMDO) were mixed with 19.7 g (0.08 mol) of triallylcyanurate (TAC) and heated to 77° C. To the heated reaction mixture was added 4.6 g (0.024 mol) of an azoibisnitrile free radical catalyst (VAZO® 67, 2,2'-azobis(2-methylbutyronitrile), commercially available from DuPont). The reaction proceeded substantially to completion after 2 hours to afford 1,250 g (0.39 mol, yield 100%) of a liquid polythioether resin having a $T_g$ of −68° C. and a viscosity of 65 poise. The resin was faintly yellow and had low odor.

The synthesis of the polythioether and other suitable polythioethers are disclosed in U.S. Pat. No. 6,172,179.

Example 5

Synthesis of Silyl-Blocked Polythioether Polymer

Permapol® P3.1E (1,402 g, a thiol-terminated polythioether polymer, available from PRC-Desoto International Inc., Sylmar, Calif.), 511.85 mL of toluene, and 152.35 g of triethylamine were added to a 2-liter, 3-necked, round-bottom flask, fitted with a thermocouple and addition funnel. The reaction mixture was stirred for approximately 30 minutes or until the mixture was visibly emulsified. 166.86 g of triethylchlorosilane was added to an addition funnel and slowly added to the reaction mixture drop-wise at room temperature over the course of 30 minutes, making sure the temperature never went above 30° C. After complete addition of triethylchlorosilane, the reaction was allowed to stir for 2-16 hours. After this, the reaction mixture was diluted with toluene, filtered over a coarse, fritted funnel, and stored in a moisture-proof container to provide a silyl-blocked polythioether polymer.

Example 6

Sealant Formulation

A sealant was prepared by mixing 50 grams of the base composition shown in Table 1, 9 grams of the accelerator shown in Table 2, and 2.95 grams of the controlled release amine catalyst of Example 1.

A portion of the sealant was heated at 180° F. for 5 minute and then allowed to further cure at ambient conditions. A second portion of the sealant was cured at ambient conditions without heating. The curing profile of the sealant is shown in FIG. 1, where the state of curing is classified according to Table 3.

The base composition is shown in Table 1.

TABLE 1

Base Composition.

| Composition | Weight, gm |
| --- | --- |
| Phenolic/polysulfide adhesion promoter | 1 |
| Fumed silica | 1.5 |
| Calcium carbonate | 55 |
| Aluminum hydroxide | 10 |
| Tetra-N-butyl titanate | 0.5 |
| Titanium dioxide | 1 |
| Methylon ® 75108 phenolic resin | 1.5 |
| Permapol ® P3.1 Polymer | 90 |

The phenolic/polysulfide adhesion promoter was prepared by reacting about 31% Varcum® 29202 phenolic resin, 66% Thiokol® LP-3 polysulfide and 3% of a polymer prepared according to Example 4 of U.S. Pat. No. 4,623,711 (at a ratio of 1 mole dithiol to 1 mole polysulfide) at a temperature of about 150° F. for 45 min., then heated to 230° F. over a 45-60 minute period, then heated at 230° F. for 165 min.

The accelerator composition is shown in Table 2.

TABLE 2

Accelerator Composition.

| Composition | Weight, gm |
| --- | --- |
| Silquest ® A-187 | 5.3 |
| Ferbam ® 76% WDG | 0.2 |
| Calcium carbonate | 90 |
| Hydrogenated terphenyl plasticizer | 24 |
| Carbon black | 0.5 |
| DEN ® 431 Novolac epoxy | 50 |
| Epon ® 828 epoxy resin | 50 |

TABLE 3

Classification of Curing State

| Scale | Description |
| --- | --- |
| 0-1600 | Actual viscosity measured by CAP 2000 Viscometer using spindle # 6, speed 50 rpm |
| 2000-3000 | Squeezable down to less than 0.005 inches between two pieces of metal plates by hand |
| 4000 | Barely squeezable by hand |
| 5000 | Squeezable down to less than 0.005 inches between two pieces of metal plates with a 40 psi torque wrench |
| 6000 | Hardness, Shore A, 0-15 |
| 7000 | Hardness, Shore A, 20 |
| 8000 | Hardness, Shore A, 30 |
| 9000 | Hardness, Shore A, 35 |
| 10000 | Hardness, Shore A, 40 |

Example 7

Silyl-Blocked Polythioether and Matrix Encapsulated Amine

Example 7A sealant was prepared by mixing 50 grams of the base composition shown in Table 4, 9 grams of the accelerator shown in Table 5, and 0.708 grams of the controlled release amine catalyst of Example 2.

Example 7B sealant was prepared by mixing 50 grams of the base composition shown in Table 4, 9 grams of the accelerator shown in Table 5, and 0.708 grams of the controlled release amine catalyst of Example 3.

A portion of both sealants was kept at ambient conditions for two weeks. The pot life and curing time were recorded. The results are shown in Table 6. It is clear that both sealants had a very long pot life of approximately 5 days; and both sealants cured in 2 weeks.

Two sets of lap shear samples were prepared according to SAE AS5127. The first set of the samples was prepared using the freshly made sealants; while the second set of samples was made using the sealants (referred as "5-day open sealants") that were kept at ambient conditions for 5 days after they were freshly made. The lap shear strength was tested on both sets of samples and the percent of cohesive failure was recorded in Table 7. It is clear from the results presented in Table 7 that the performance of the sealants after 5 days was comparable to the performance of freshly made sealants.

TABLE 4

Base Composition

| Composition | Weight, gm |
| --- | --- |
| Phenolic/polysulfide adhesion promoter | 1 |
| Fumed silica | 1.5 |
| Calcium carbonate | 55 |
| Aluminum hydroxide | 10 |
| Tetra-N-butyl titanate | 0.5 |
| Titanium dioxide | 1 |
| Methylon ® 75108 phenolic resin | 1.5 |
| Example 5 Polymer | 90 |

The phenolic/polysulfide adhesion promoter was prepared by reacting about 31% Varcum® 29202 phenolic resin, 66% Thiokol® LP-3 polysulfide and 3% of a polymer prepared according to Example 4 of U.S. Pat. No. 4,623,711 (at a ratio of 1 mole dithiol to 1 mole polysulfide) at a temperature of about 150° F. for 45 min., then heated to 230° F. over a 45-60 minute period, and then heated at 230° F. for 165 min.

The accelerator composition is shown in Table 5.

TABLE 5

Accelerator Composition

| Composition | Weight, gm |
| --- | --- |
| Silquest ® A-187 | 5.3 |
| Ferbam ® 76% WDG | 0.2 |
| Calcium carbonate | 90 |
| Hydrogenated terphenyl plasticizer | 24 |
| Carbon black | 0.5 |
| DEN ® 431 Novolac epoxy | 50 |
| Epon ® 828 epoxy resin | 50 |

TABLE 6

Pot Life and Cure Time

| Example | Pot Life, days | Cure time, days |
|---|---|---|
| 7A | 5 | ~14 |
| 7B | 5 | ~14 |

TABLE 7

Sealant performance.

| Example | Lap shear strength (psi)/cohesive failure(%), for freshly made sealant | Lap shear strength (psi)/cohesive failure(%), for 5-day open sealants |
|---|---|---|
| 7A | 183/100% CF | 173/100% CF |
| 7B | 241/100% CF | 248/100CF % |

Figure 2:
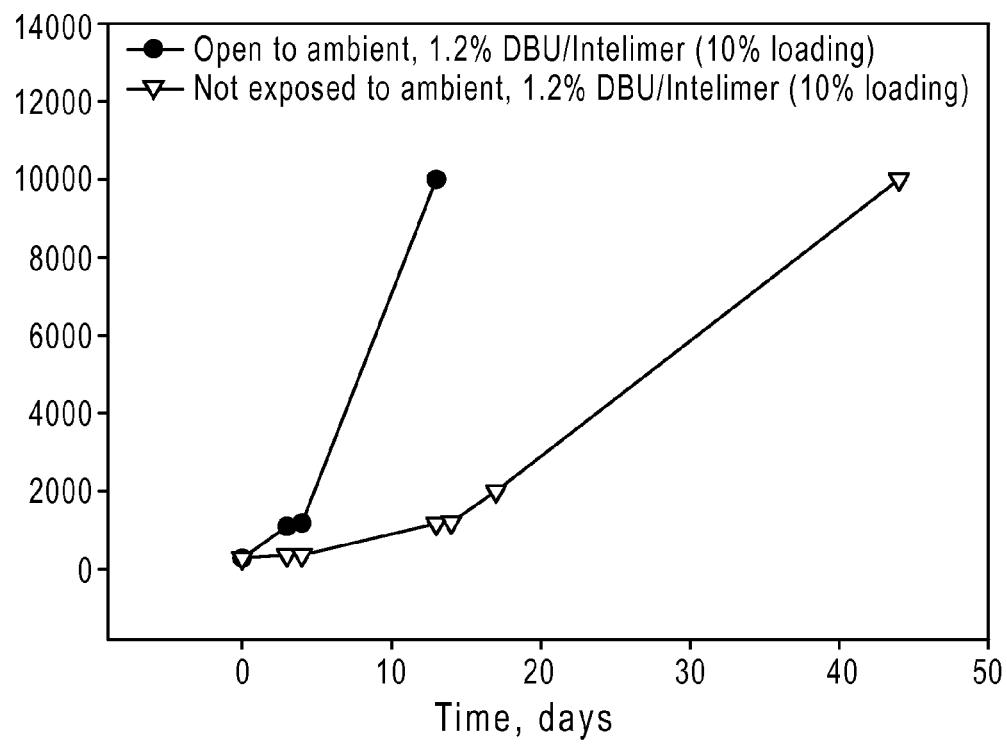
FIG. 2 is a graph showing the viscosity with time of the sealant composition of Example 7 comprising a silyl-blocked polythioether, a diepoxy, and 1.2 wt % matrix encapsulated amine (a) exposed to ambient moisture, and (b) sealed from ambient moisture.

The viscosity of the sealant over time when exposed to ambient moisture and when sealed from ambient moisture is shown in FIG. 2 and in Table 3.

Comparative Example 1

A sealant was prepared by mixing 50 grams of the base composition of Example 6, 9 grams of the accelerator of Example 6, and 0.21 grams of 1,8-diazabicyclo-5,4,0-undecene-7.

The sealant was allowed to cure at ambient conditions. The sealant cured completely in 4 hours.

Finally, it should be noted that there are alternative ways of implementing the embodiments disclosed herein. Accordingly, the present embodiments are to be considered as illustrative and not restrictive. Furthermore, the claims are not to be limited to the details given herein, and are entitled their full scope and equivalents thereof.

What is claimed is:

1. A composition comprising:
   (a) a sulfur-containing polymer comprising a thiol-terminated sulfur-containing polymer and a silyl-blocked thiol-terminated polythioether;
   (b) a polyepoxide curing agent; and
   (c) a controlled-release amine catalyst,
   wherein the silyl-blocked thiol-terminated polythioether is selected from a silyl-blocked thiol-terminated polythioether of Formula (6), a silyl-blocked thiol-terminated polythioether of Formula (6a), and a combination thereof:

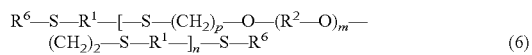

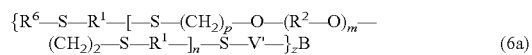

wherein:
   each $R^1$ independently is selected from $C_{2-6}$ alkanediyl, $C_{6-8}$ cycloalkanediyl, $C_{6-10}$ alkanecycloalkanediyl, $C_{5-8}$ heterocycloalkanediyl, and $-[(-CHR^3-)_s-X-]_q-(-CHR^3-)_r-$; wherein:
   s is an integer from 2 to 6;
   q is an integer from 1 to 5;
   r is an integer from 2 to 10;
   each $R^3$ is independently selected from hydrogen and methyl; and
   each X is independently selected from $-O-$, $-S-$, and $-NR-$, wherein R is selected from hydrogen and methyl;

each $R^2$ is independently selected from $C_{2-10}$ alkanediyl, $C_{6-8}$ cycloalkanediyl, $C_{6-14}$ alkanecycloalkanediyl, and $-[(-CHR^3-)_s-X-]_q-(-CHR^3-)_r-$, wherein s, q, r, $R^3$, and X are as defined above;
   m is an integer from 1 to 50;
   n is an integer from 1 to 60;
   p is an integer from 2 to 6;
   B represents a core of a z-valent, alkenyl-terminated polyfunctionalizing agent $B(-V)_z$ wherein:
   z is an integer from 3 to 6;
   each $-V$ is a group comprising a terminal alkenyl group; and
   each $-V'-$ is derived from the reaction of $-V$ with a thiol; and
   each $R^6$ is independently a moiety comprising a terminal group of Formula (7):

wherein $R^3$, $R^4$, and $R^5$ are each independently selected from a $C_{1-6}$ n-alkyl group, a $C_{3-6}$ branched alkyl group, a substituted $C_{1-6}$ n-alkyl group, and a phenyl group.

2. The composition of claim 1, wherein the thiol-terminated sulfur-containing polymer comprises a thiol-terminated polythioether selected from a difunctional thiol-terminated polythioether, a trifunctional thiol-terminated polythioether, and a combination thereof.

3. The composition of claim 2, wherein the thiol-terminated polythioether is characterized by an average functionality from 2.05 to 3.

4. The composition of claim 2, wherein the thiol-terminated polythioether is selected from a thiol-terminated polythioether polymer of Formula (2), a thiol-terminated polythioether polymer of Formula (2a), and a combination thereof:

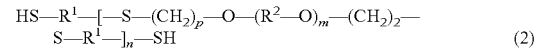

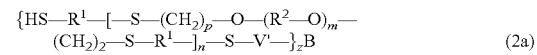

wherein:
   each $R^1$ independently is selected from $C_{2-10}$ alkanediyl, $C_{6-8}$ cycloalkanediyl, $C_{6-14}$ alkanecycloalkanediyl, $C_{5-8}$ heterocycloalkanediyl, and $-[(-CHR^3-)_s-X-]_q-(-CHR^3-)_r-$, wherein:
   s is an integer from 2 to 6;
   q is an integer from 1 to 5;
   r is an integer from 2 to 10;
   each $R^3$ is independently selected from hydrogen and methyl; and
   each X is independently selected from $-O-$, $-S-$, and $-NR-$, wherein R is selected from hydrogen and methyl;
   each $R^2$ is independently selected from $C_{1-10}$ alkanediyl, $C_{6-8}$ cycloalkanediyl, $C_{6-14}$ alkanecycloalkanediyl, and $-[(-CHR^3-)_s-X-]_q-(-CHR^3-)_r-$, wherein s, q, r, $R^3$, and X are as defined as for $R^1$;
   m is an integer from 0 to 50;
   n is an integer from 1 to 60;
   p is an integer from 2 to 6;

B represents a core of a z-valent, vinyl-terminated polyfunctionalizing agent B(—V)$_z$ wherein:
z is an integer from 3 to 6; and
each V is a group comprising a terminal vinyl group; and
each —V'— is derived from the reaction of —V with a thiol.

5. The composition of claim 2, wherein the thiol-terminated polythioether comprises the reaction product of reactants comprising:
(a) a dithiol of Formula (3):

$$HS-R^1-SH \quad (3)$$

wherein:
R$^1$ is selected from C$_{2-6}$ alkanediyl, C$_{6-8}$ cycloalkanediyl, C$_{6-10}$ alkanecycloalkanediyl, C$_{5-8}$ heterocycloalkanediyl, and —[(—CHR$^3$—)$_s$—X—]$_q$—(—CHR$^3$—)$_r$—; wherein:
each R$^3$ is independently selected from hydrogen and methyl;
each X is independently selected from —O—, —S—, —NH—, and —NR— wherein R is selected from hydrogen and methyl;
s is an integer from 2 to 6;
q is an integer from 1 to 5; and
r is an integer from 2 to 10; and
(b) a divinyl ether of Formula (4):

$$CH_2=CH-O-(-R^2-O-)_m-CH=CH_2 \quad (4)$$

wherein:
each R$^2$ is independently selected from C$_{1-10}$ alkanediyl, C$_{6-8}$ cycloalkanediyl, C$_{6-14}$ alkanecycloalkanediyl, and —[(—CHR$^3$—)$_s$—X—]$_q$—(—CHR$^3$—)$_r$—, wherein s, q, r, R$^3$, and X are as defined for R$^1$;
m is an integer from 0 to 50;
n is an integer from 1 to 60; and
p is an integer from 2 to 6.

6. The composition of claim 5, wherein the reactants comprise (c) a polyfunctional compound B(—V)$_z$, wherein:
z is an integer from 3 to 6; and
each —V is a moiety comprising a terminal group that is reactive with a thiol group.

7. The composition of claim 1, wherein the silyl-blocked thiol-terminated polythioether is characterized by an average functionality from 2.05 to 3.

8. The composition of claim 1, wherein the silyl-blocked thiol-terminated polythioether comprises the reaction product of reactants comprising:
(a) a polythioether-is-selected from a thiol-terminated polythioether of Formula (2), a thiol-terminated polythioether of Formula (2a), and a combination thereof:

$$HS-R^1-[-S-(CH_2)_p-O-(R^2-O)_m-(CH_2)_2-S-R^1-]_n-SH \quad (2)$$

$$\{HS-R^1-[-S-(CH_2)_p-O-(R^2-O)_m-(CH_2)_2-S-R^1-]_n-S-V'-\}_zB \quad (2a)$$

wherein:
each R$^1$ is independently selected from C$_{2-6}$ alkanediyl, C$_{6-8}$ cycloalkanediyl, C$_{6-10}$ alkanecycloalkanediyl, C$_{5-8}$ heterocycloalkanediyl, and —[(—CHR$^3$—)$_s$—X—]$_q$—(—CHR$^3$—)$_r$—; wherein:
s is an integer from 2 to 6;
q is an integer from 1 to 5;
r is an integer from 2 to 10;
each R$^3$ is independently selected from hydrogen and methyl; and
each X is independently selected from —O—, —S—, and —NR—, wherein R is selected from hydrogen and methyl;
each R$^2$ is independently selected from C$_{1-10}$ alkanediyl, C$_{6-8}$ cycloalkanediyl, C$_{6-14}$ alkanecycloalkanediyl, and —[(—CHR$^3$—)$_s$—X—]$_q$—(—CHR$^3$—)$_r$—, wherein s, q, r, R$^3$, and X are as defined above;
m is an integer from 0 to 50;
n is an integer from 1 to 60;
p is an integer from 2 to 6;
B represents a core of a z-valent, alkenyl-terminated polyfunctionalizing agent B(—V)$_z$ wherein:
z is an integer from 3 to 6; and
each —V is a group comprising a terminal alkenyl group; and
each —V'— is derived from the reaction of —V with a thiol; and
(b) a halosilane of Formula (8):

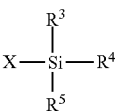

(8)

wherein:
X is halogen; and
R$^3$, R$^4$, and R$^5$ are each independently selected from a C$_{1-6}$ n-alkyl group, a C$_{3-6}$ branched alkyl group, a substituted C$_{1-6}$ n-alkyl group, and a phenyl group.

9. The composition of claim 8, wherein z is 3 and the polyfunctionalizing agent is a trifunctionalizing agent.

10. The composition of claim 1, wherein the polyepoxide comprises a difunctional epoxy, a trifunctional epoxy, and a combination thereof.

11. The composition of claim 1, wherein the controlled-release amine catalyst comprises a matrix encapsulant comprising an amine catalyst.

12. The composition of claim 11, wherein the matrix encapsulant is capable of releasing the amine catalyst upon heating or ultrasonication.

13. The composition of claim 11, wherein the matrix encapsulant is capable of releasing the amine catalyst at ambient temperature.

14. The composition of claim 11, wherein the amine catalyst is selected from 1,8-diazabicyclo-5,4,0-undecene-7, 1,3-diazabicyclo[2.2.2]octane, and a combination thereof.

15. A method of sealing an aperture comprising:
(a) applying the composition of claim 1 to at least one surface defining an aperture;
(b) assembling the surfaces defining the aperture; and
(c) curing the sealant to provide a sealed aperture.

* * * * *